US006405248B1

(12) United States Patent
Wood

(10) Patent No.: US 6,405,248 B1
(45) Date of Patent: Jun. 11, 2002

(54) METHOD AND APPARATUS FOR DETERMINING ACCURATE TOPOLOGY FEATURES OF A NETWORK

(75) Inventor: Michael Wood, Long Island City, NY (US)

(73) Assignee: Micromuse, Inc., San Francisco, CA (US)

( * ) Notice: Subject to any disclaimer, the term of this patent is extended or adjusted under 35 U.S.C. 154(b) by 0 days.

(21) Appl. No.: 09/611,408

(22) Filed: Jul. 6, 2000

Related U.S. Application Data

(62) Division of application No. 09/204,387, filed on Dec. 2, 1998, now Pat. No. 6,108,702.

(51) Int. Cl.$^7$ .............................................. G06F 15/173
(52) U.S. Cl. ..................... 709/223; 709/224; 709/238
(58) Field of Search ................................. 709/223, 224, 709/220, 221, 227, 229, 238, 245, 249, 203; 370/253, 409, 397, 401, 351

(56) References Cited

U.S. PATENT DOCUMENTS

| | | | |
|---|---|---|---|
| 5,185,860 A | 2/1993 | Wu | 709/224 |
| 5,261,044 A | 11/1993 | Dev et al. | 345/357 |
| 5,295,244 A | 3/1994 | Dev et al. | 345/357 |
| 5,297,138 A | 3/1994 | Black | 370/254 |
| 5,436,909 A | 7/1995 | Dev et al. | 714/4 |
| 5,450,408 A | 9/1995 | Phall | 370/256 |

(List continued on next page.)

FOREIGN PATENT DOCUMENTS

| | | |
|---|---|---|
| WO | WO 95/01030 | 1/1995 |
| WO | WO 95/06989 | 3/1995 |
| WO | WO 96/13108 | 5/1996 |
| WO | WO 97/18658 | 5/1997 |
| WO | WO 97/18659 | 5/1997 |
| WO | WO 97/20419 | 6/1997 |

OTHER PUBLICATIONS

David C. Feldmeier, "Statistical Monitors for Local Area Networks", Proceedings of 11$^{th}$ Conference on Local Computer Networks, Oct. 6–8, 1986.

Yasuda et al., "Automated Network Connection Tracing and Data Gathering Methods in the SDG Network", IEEE Transactions on Communications, vol. 42, No. 2–4, Feb.–Apr. 1994, pp. 1065–1075.

Michael Soha, "A Distributed Approach to LAN Monitoring Using Intelligent High Performance Monitors", IEEE Network, vol. 1, No. 3, Jul. 1987, pp. 13–20.

(List continued on next page.)

Primary Examiner—Mehmet B. Geckil
(74) Attorney, Agent, or Firm—Brown Raysman Millstein Felder & Steiner LLP

(57) ABSTRACT

A monitoring system for determining accurate topology features of a network, and methods of operating the monitoring system, are disclosed. In the preferred embodiment, the system creates an accurate topology map of a given network by: obtaining a list of managed network devices; identifying trunk ports, link channel ports, and trunk channel ports; identifying link port and node ports; determining connections between the ports; storing the collected information; and displaying the network topology. Methods are disclosed for identifying link and node ports. In the preferred method, information regarding the devices; including VLAN/backplane information, router ARP table information, device interface information, and physical address information for machines and devices connected to the network is obtained. Also, the ports and/or devices are logically grouped in order to provide more accurate topology information. Source address table timing information is obtained for each device, and a historical database of source table information is kept. Filters may then be utilized on the source address tables in order to provide more accurate topology results. Connections between nodes are also resolved by utilizing sorting methods. Alternative methods are also disclosed for identifying link ports and determining connections between nodes.

16 Claims, 25 Drawing Sheets

U.S. PATENT DOCUMENTS

| | | | |
|---|---|---|---|
| 5,485,455 A | 1/1996 | Dobbins et al. | 370/255 |
| 5,504,921 A | 4/1996 | Dev et al. | 709/223 |
| 5,559,955 A | 9/1996 | Dev et al. | 714/4 |
| 5,590,120 A | 12/1996 | Vaishnavi et al. | 370/254 |
| 5,627,819 A | 5/1997 | Dev et al. | 370/250 |
| 5,675,741 A | 10/1997 | Aggarwal et al. | 709/242 |
| 5,727,157 A | 3/1998 | Orr et al. | 709/224 |
| 5,751,965 A | 5/1998 | Mayo et al. | 709/224 |
| 5,754,532 A | 5/1998 | Dev et al. | 370/250 |
| 5,793,362 A | 8/1998 | Matthews et al. | 709/224 |
| 5,809,286 A * | 9/1998 | McLain, Jr. et al. | 703/23 |
| 5,812,750 A | 9/1998 | Dev et al. | 714/4 |
| 5,822,305 A | 10/1998 | Vaishnavi et al. | 370/254 |
| 5,825,772 A * | 10/1998 | Dobbins et al. | 370/396 |
| 5,905,859 A * | 5/1999 | Holloway et al. | 713/201 |
| 6,108,702 A * | 8/2000 | Wood | 709/224 |
| 6,167,052 A * | 12/2000 | McNeill et al. | 370/399 |
| 6,205,147 B1 * | 3/2001 | Mayo et al. | 370/397 |

OTHER PUBLICATIONS

William B. norton, "Integrating Network Discovery with Networking Monitoring: The NSFNET Method", Proc. INET 1994, 563-1–563-6.

Amer et al., "Management of Sampled Real–Time Network Measurements", 14$^{th}$ Conference on Local Computer Networks, Oct. 10–12, 1989, pp. 62–68.

"Robust Method for Training Sequential Decision–Making for Artificial Intelligence Systems", IBM Technical Disclosure Bulletin, vol. 31, No. 1, Jun. 1988.

* cited by examiner

Switch A

Switch B

T1

T2 (where T2>T1)

LD 1

LD 4

LD 5

LD 1

LD 5

LD 4

Because the groups are sorted in ascending order, the port containing the source address Y in the group above (Group 1) is connected to the port containing source address X in the group below (Group 2).

METHOD AND APPARATUS FOR DETERMINING ACCURATE TOPOLOGY FEATURES OF A NETWORK

This is a divisional application of application Ser. No. 09/204,387, filed Dec. 2, 1998, now U.S. Pat. No. 6,108,702, which application is hereby incorporated by reference into this application in its entirety.

FIELD OF THE INVENTION

This invention relates to computer networks. More particularly, the invention relates to methods for determining accurate topology features of a given network utilizing source address tables.

BACKGROUND OF THE INVENTION

As more and more companies rely on computer networks as an integral part of doing business, it is becoming increasingly desirable to maintain accurate topology maps for such networks. And, with computer networks continuing to expand both in complexity and scope, using manual means to maintain accurate topology maps is becoming a very difficult to impossible endeavor.

Thus, systems and methods have been developed to attempt to automatically obtain information about networks in order to create topology maps. These systems and methods include U.S. Pat. No. 5,727,157 to Orr et al., entitled "Apparatus and Method for Determining a Computer Network Topology"; U.S. Pat. No. 5,450,408 to Phial et al., entitled "Method of Ascertaining Topology Features of a Network"; U.S. Pat. No. 5,297,138 to Black, entitled "Determining Physical Topology Across Repeaters and Bridges in a Computer Network"; and PCT International Publication No. WO 97/18659 to Dawes et al., entitled "Method of Determining the Topology of a Network of Objects."

Each of these systems and methods have limitations that prevent them from fulfilling the industry's needs for timely and accurate network topology information. For example, the method disclosed by Dawes et al., which measures traffic information on a given network, suffers from an inability to obtain accurate topology features in a timely manner. Indeed, independent tests performed by Network Computing Magazine on Loran Technologies implementation of the method disclosed by Dawes et al. showed that this method required one month before accurate results were obtained. During the three month testing period, the accuracy rose to approximately 90 t. ("Network Computing", "Network Management Solutions Lack Clear Leader", Vol. 9, No. 15, Aug. 15, 1998, pp. 62, 64). The Phaal et al. patent, on the other hand, requires implementing probes throughout the global network which can require a significant amount of administrative effort.

Also, while the Black and the Orr patents utilize source address table information contained within network devices in an effort to resolve topology features of computer networks, the disclosed methods are brute force approaches that do not take account of critical device and connectivity information when attempting to determine network interconnections.

In sum, there remains a need for a system and method for determining accurate topology features of a network. The invention described herein employs an organizational approach performed on logical groupings to avoid ambiguity by design. In particular, the preferred embodiment utilizes a combination of logical groupings called circuits and link domains to avoid inaccuracies. (These concepts and other concepts relevant to the present invention are discussed below.) Moreover, the present invention preferably utilizes various filters on device source address table information and router ARP table information to ensure that the topology information is accurate. The end result is that connections can be calculated using any standard sorting function—resulting in a timely and accurate determination of device connections from which a network topology map can be displayed.

SUMMARY OF THE INVENTION

The present invention is directed to a method for determining what ports in a computer network are link ports, in a system for determining topology features of a network, the method comprising the steps of: (a) obtaining information regarding devices connected to the network; (b) obtaining source address table information for each device; (c) selecting a port on a device that has two or more source addresses; (d) if any other device has two or more ports that have at least one source address seen on the selected port, tagging the selected port as a link port; repeating steps (c) and (d) for every port in each device that has two or more—source addresses. The method may also include the steps of maintaining time information relating to the step of obtaining source address table information and filtering the source address table information based on the time information.

The step of maintaining time information preferably maintains data regarding the time that a source address was first found on a port, the time that the source address was last found on the port, and the time the source address table containing the port was last polled. The step may also include maintaining information regarding what source addresses have been found on ports over a plurality of polling periods.

The step of filtering may include the step of filtering source addresses where the time that the source address was last seen minus the time the source address was first seen is less than the source address table aging time. It may also include filtering source address tables that do not age.

Advantageously, the monitoring system may also operate so as to assign logical port numbers to the ports of the devices.

According to another teaching of the present invention, related devices are grouped for polling before performing the step of obtaining source address table information for each device.

The present invention is also directed to a method for determining what ports in a computer network are link ports, in a system for determining topology features of a network, the method comprising the steps of (a) obtaining information regarding devices connected to the network; (b) logically grouping the ports and/or devices on the network; (c) obtaining source address table information for each device; (d) selecting a port in a logical group that has two or more source addresses; (e) if any other logical group has two or more ports that have at least one source address seen on the selected port, tagging the selected port as a link port; (f) repeating steps (d) and (e) for every port in each logical group that has two or more source addresses.

The logical groupings in this method-may be local domains, global domains, link domains, or circuits.

Like the previous method, this method may also include the steps of maintaining time information relating to the step of obtaining source address table information and filtering the source address table information based on the time information.

Also, in this method, the step of maintaining time information preferably maintains data regarding the time that a source address was first found on a port, the time that the source address was last found on the port, and the time the source address table containing the port was last polled. This step may also include maintaining information regarding what source addresses have been found on ports over a plurality of polling periods.

The step of filtering may include the step of filtering source addresses where the time that the source address was last seen minus the time the source address was first seen is less than the source address table aging time. It may also include filtering source address tables that do not age.

Advantageously, as discussed above, the monitoring system may also operate so as to assign logical port numbers to the ports of the devices.

Also like the previous method, related devices are preferably grouped for polling before performing the step of obtaining source address table information for each device.

The present invention is also directed to a method for determining topology features of a computer network comprising the steps of identifying devices on the network; identifying channel and trunk ports on the network; identifying node ports on the network; and determining connections between the ports on the network.

In this method, the step of identifying node ports on the network preferably includes the steps of logically grouping ports and/or devices on the network; obtaining source address information on the devices; maintaining information relating to the step of obtaining source address information; and filtering the source address information.

The step of logically grouping in this method can include the step of determining local domains so as to group ports on a single device where one port in the group can communicate to any other port in the group through the devices backplane. In addition, the step of logically grouping can include the step of grouping local domains that are extended among two or more devices via trunk ports and/or trunk channels. Still further, the step of logically grouping can include the step of grouping all local domains and group domains into circuits.

The present invention is also directed to a method for determining what ports in a computer network are node ports, in a system for determining topology features of a network, comprising the steps of: obtaining information regarding devices connected to the network; assigning logical port numbers to ports on the devices; obtaining source address table information from each device; maintaining time information relating to the step of obtaining source address table information; filtering the source address table information based on the time information; and assigning the filtered source address table information to the logical port numbers.

The step of maintaining time information in this method can include maintaining information relating to when a port of a device was first seen and last seen, and also information relating to when the port was last polled by the step of obtaining source address tables from each device.

In this method, the step of filtering can include the step of filtering source addresses where the time that the source address was last seen minus the time the source address was first seen is less than the source address aging time. It may also include filtering source address tables that do not age.

The present invention is still further directed to a method for determining topology features of a computer network comprising the steps of identifying devices on the network; identifying channel and trunk ports on the network; identifying link and node ports on the network; and determining connections between the devices and ports on the network.

In this method the step of determining connections between the devices and ports on the network preferably includes the step of determining link and channel link connections. It also preferably includes the step of determining trunk and channel trunk connections.

This step of identifying link and node ports on the network can include the step of assigning logical port numbers to the ports. It may also include the steps of assigning local domains; assigning global domains; assigning link domains; and determining which link domains can communicate with each other without the assistance of a router. It may also include the steps of assigning local domains; assigning global domains; and determining which of the local domains and global domains can communicate with each other without the assistance of a router.

The step of assigning global domains in this step includes the step of determining which of the local domains are extended among two or more devices via trunk ports and/or trunk channels.

DETAILED DESCRIPTION OF PREFERRED EMBODIMENT OF THE INVENTION

The system and method of the present invention are discussed in detail below. First, however, we provide a brief overview of certain concepts relating to the invention, together with illustrative examples to assist the reader in understanding such concepts. Next, we provide illustrative examples showing shortcomings of prior art systems-and methods, again to assist the reader in understanding my invention. Then, we describe the preferred embodiment of my invention together with an illustrative example.

As is well known, computer networks provide communication paths between various machines that are interconnected within a given network. Networks, when operating properly, allow information to be sent from one machine on the network to other machines on the network. Information from machine to machine is generally sent through interconnect devices. Such interconnect devices amplify and/or route traffic within the network. Some of these interconnect devices, e.g., routers, break down larger networks into manageable subnetworks. In this disclosure, a device refers to a datalink level hub, switch bridge, router, repeater, etc. unless stated otherwise. A node refers to any machine (e.g., a workstation, server, printer, mainframe, etc.) physically attached to a device.

An aspect of my invention is the logical grouping of ports and/or devices in order to obtain more accurate topology information. In this regard, a local domain is a group of ports on a single device such that any node connected to one port in the group can talk to any other port in the group (excluding filters) directly through the backplane of the device. (Some devices such as the Bay Networks 350T allow for filters to limit traffic between nodes. Local domains are assigned as if no such filters were set.) on most devices, a VLAN (Virtual Local Area Network) or backplane assignment will designate the local domain. For example, on a Synoptics 5000 Concentrator every port assigned to backplane 1 belongs to the same local domain. on a Catalyst 5000, every port belonging to the same VLAN belongs to the same local domain.

A local domain does not span across multiple devices. Thus a hub is subdivided into one or more local domains. If a hub uses filters, the filter settings are ignored when determining local domain membership for each port. For example, on a Bay 350T, ports can be assigned to multiple VLANs. In this case, every VLAN assigned to that port belongs to one common local domain, because the Bay 350T uses multiple VLANs on a single port as a broadcast filter mechanism.

Figure 1:
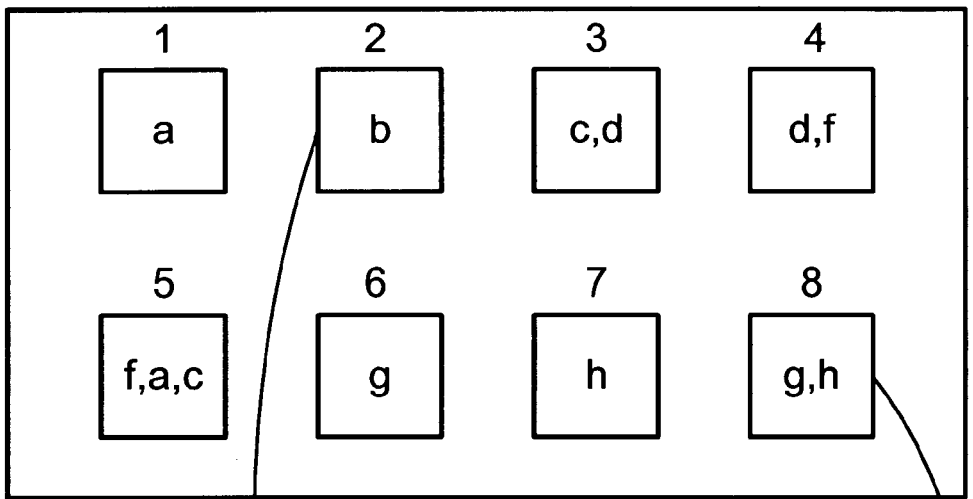
FIG. 1 is a schematic diagram depicting VLAN assignments and interconnections between two devices.
Figure 1:
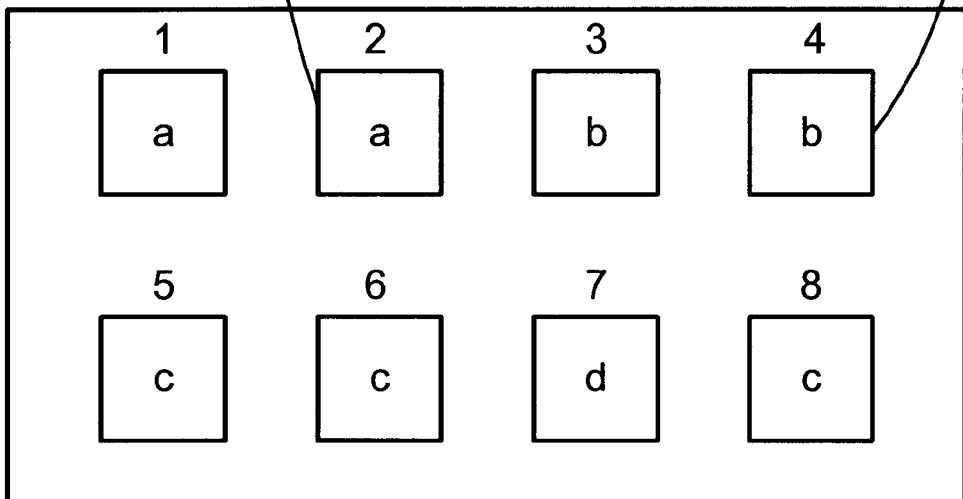

FIG. 1 depicts an illustrative assignment of VLANs to ports at switches A and B. Each of the small boxes numbered 1 through 8 on switches A and B represents a port. The letter or letters within each box identifies the VLAN to which the port is assigned. Thus, switch A port 1 belongs to VLAN a and switch A port 2 belongs to VLAN b. Switch A port 3 belongs to VLANs c and d. And so on. On switch A, VLANs c and d belong to the same local domain because they are grouped together at port 3. (local domain assignment ignores broadcast filtering). Likewise, switch A VLANs f, a, and c are assigned to the same local domain because they are grouped together on port 5 of Switch A. Local domain assignments are relative to the device, VLAN, and port. The following table shows the local domain assignments for the ports depicted in FIG. 1:

TABLE 1

| Hub ID | Port | VLANs/Bkplns | Local Domain |
|---|---|---|---|
| Switch A | 1 | a | Z |
| Switch A | 2 | b | Y |
| Switch A | 3 | c, d | Z |
| Switch A | 4 | d, f | Z |
| Switch A | 5 | f, a, c | Z |
| Switch A | 6 | 9 | X |
| Switch A | 7 | h | X |
| Switch A | 8 | g, h | X |
| Switch B | 1 | a | W |
| Switch B | 2 | a | W |
| Switch B | 3 | b | V |
| Switch B | 4 | b | V |
| Switch B | 5 | c | U |
| Switch B | 6 | c | U |
| Switch B | 7 | d | T |
| Switch B | 8 | c | U |

Note that ports, 1, 3, 4, and 5 of switch A are assigned to the local domain Z. This is because the ports share a common VLAN. Namely, VLAN a is found on port 1 and also on port 5 and port 5 shares VLANs with ports 3 and 4. Similarly, ports 6, 7, and 8 of switch A share a common VLAN and are thus assigned to the local domain X.

It should be noted that trunk ports and channel trunk ports are not assigned local domain numbers. A trunk port is a port through which one device attaches to another while preserving the VLAN membership of the data during transmission and reception. Examples of trunk ports include ISL ports on a Cisco Catalyst 5000 and expansion ports on a Synoptics 28k. Bay 350T ports are not considered trunk ports even if they have multiple VLANs assigned to them because the VLAN membership is not preserved during transmission and reception.

A port through which one device attaches to another without preserving VLAN membership is termed a link port in this disclosure. For example, if a cable is attached from a standard Cisco Catalyst 5000 port to a Synoptics 5000 concentrator, the ports to which the cables attach are considered link ports.

A node port is simply a port where a node attaches to the network infrastructure.

Figure 2:
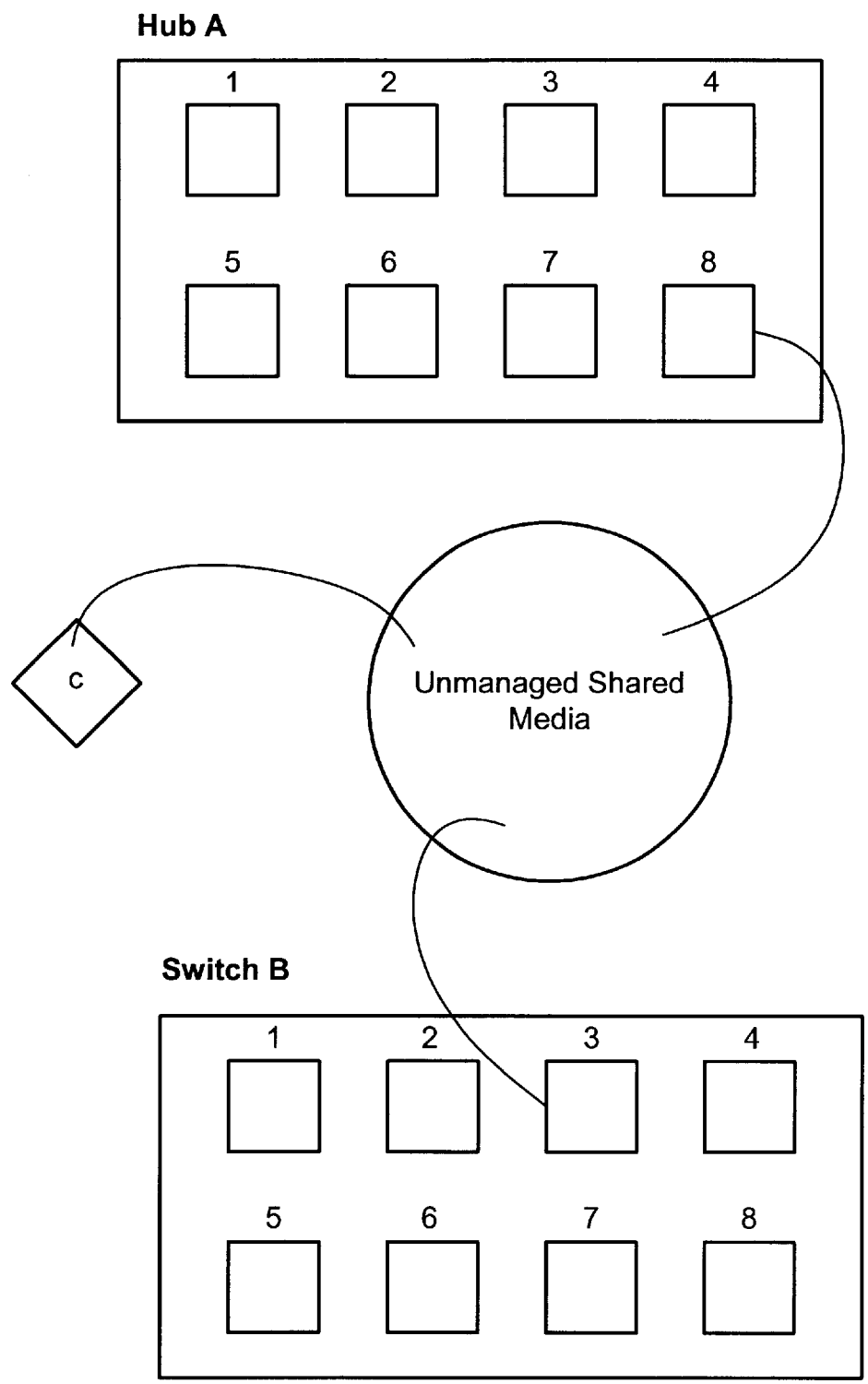
FIGS. 2–5 are schematic diagrams illustrating interconnections between devices.

As is illustrated by FIG. 2, a port can be classified as both a link port and a node port. As shown in FIG. 2, port 8 of hub A attaches to an unmanaged shared media hub, Node C attaches directly to the unmanaged shared media hub, and port 3 of switch B also attaches to the shared media hub. Thus, port 8 of hub A and port 3 of switch B are considered both link and node ports. That is, node C in this example attaches to the network infrastructure via the unmanaged shared media hub. The first ports through which node C enters the managed network is through port 8 of hub A and port 3 of switch B. Thus, both of these ports are node ports (the entry source for node C.) However, these ports also serve to connect hub A to switch B, and are thus also link ports.

Dump ports are a special type of link port that do not record the source addresses of the data they receive. 3COM SuperStack switches, e.g., use dump ports. These switches only keep track of the source addresses of data received on each node port, not the dump ports. In short, when a device that is attached to a node port sends a packet to another device, the switch examines the packet to determine if the data is destined for a device attached to another node port. If it is, the switch sends the packet to the intended node port. If not, the packet is transmitted out the dump port.

A channel is a group of two or more ports through which another individual device communicates. Channels are used to load balance traffic. If a channel preserves VLAN membership, it is considered to be a trunk channel. If not, it is considered to be a link channel.

As is described below in connection with the preferred method of operation of the present invention, VLAN/backplane information, dump port information, trunk port information, link channel port information, and trunk channel port information for every managed device on a given network are simply loaded and stored by the monitoring system using standard network protocol queries. The determination of link ports and node ports, on the other hand, are resolved by the multi step methods described below in connection with the preferred method of operation.

In the present invention, each independent group of channel ports is reduced down to a single logical port number when links are being identified. The following table illustrates the logical assignment of port numbers based upon Hub ID and Channel ID for the illustrative device interconnections shown in FIG 3:

TABLE 2

| Hub ID | Port | Channel ID | Logical Port Num |
|---|---|---|---|
| Switch A | 1 | link channel 1 | 1 |
| Switch A | 2 | link channel 1 | 1 |
| Switch A | 3 | | 2 |
| Switch A | 4 | | 3 |
| Switch A | 5 | | 4 |
| Switch A | 6 | | 5 |
| Switch B | 1 | link channel 1 | 6 |
| Switch B | 2 | link channel 1 | 6 |
| Switch B | 3 | | 7 |
| Switch B | 4 | trunk channel 1 | 8 |
| Switch B | 5 | trunk channel 1 | 8 |
| Switch B | 6 | trunk channel 1 | 8 |
| Switch C | 1 | link channel 2 | 9 |
| Switch C | 2 | link channel 2 | 9 |
| Switch C | 3 | | 10 |
| Switch C | 4 | trunk channel 1 | 11 |
| Switch C | 5 | trunk channel 1 | 11 |
| Switch C | 6 | trunk channel 1 | 11 |
| Switch D | 1 | link channel 2 | 12 |
| Switch D | 2 | link channel 2 | 12 |
| Switch D | 3 | | 13 |
| Switch D | 4 | | 14 |
| Switch D | 5 | | 15 |
| Switch D | 6 | | 16 |

Figure 3:
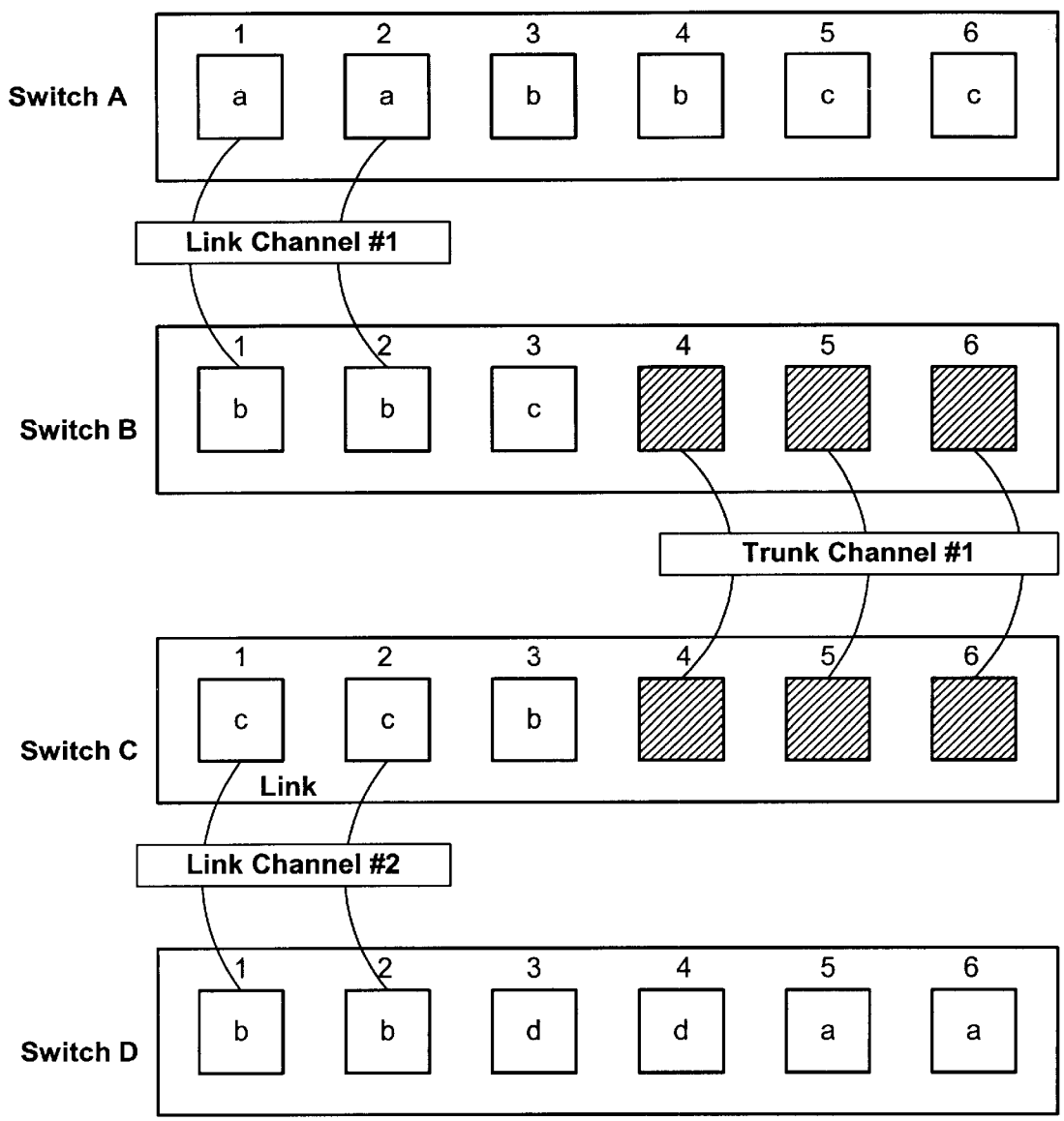

As the table above illustrates, there are 16 logical ports in FIG. 3 even though there are 24 physical ports. A channel causes a group of physical ports to behave as if they were a single logical port.

Every network device records the source address of each packet of information received on each port in its can table (i.e., source address table). Most devices display their cam tables relative to the physical ports. In the present invention, each device's source address table is mapped to the logical port numbers. By way of example, if the source address table for switch C port 4 in FIG. 3 contained entries for s1, s2, & s3, and Switch C port 5 contained entries for s4 & s5, and switch C port 6 contained entries for s6 & s7 then (using the logical port numbers given above) logical port number 11 would be treated as if its source address table contained entries s1, s2, s3, s4, s5, s6, & s7.

In this disclosure, a global domain refers to each local domain that is extended among two or more devices via trunk ports and/or trunk channels. Consider FIG. 4. In this illustrative example, switch A port 1 belongs to VLAN a, switch A port 2 belongs to VLAN a, switch A port 3 belongs to VLAN b, etc. Switch A port 8 connects to switch B port 4 via a trunk port. Switch B port 5 connects to switch C port 1 via a link port. Because switches A and B are connected via a trunk port, VLAN b of switch A and VLAN b of switch B belong to the same global domain. Likewise, VLAN c of switch A and VLAN c of switch B belong to identical global domains. However, VLAN b of switch C is not a member of any global domain because switches B and C are connected via link ports. VLAN c of switch C is not a member of a global domain for the same reason.

Figure 4:
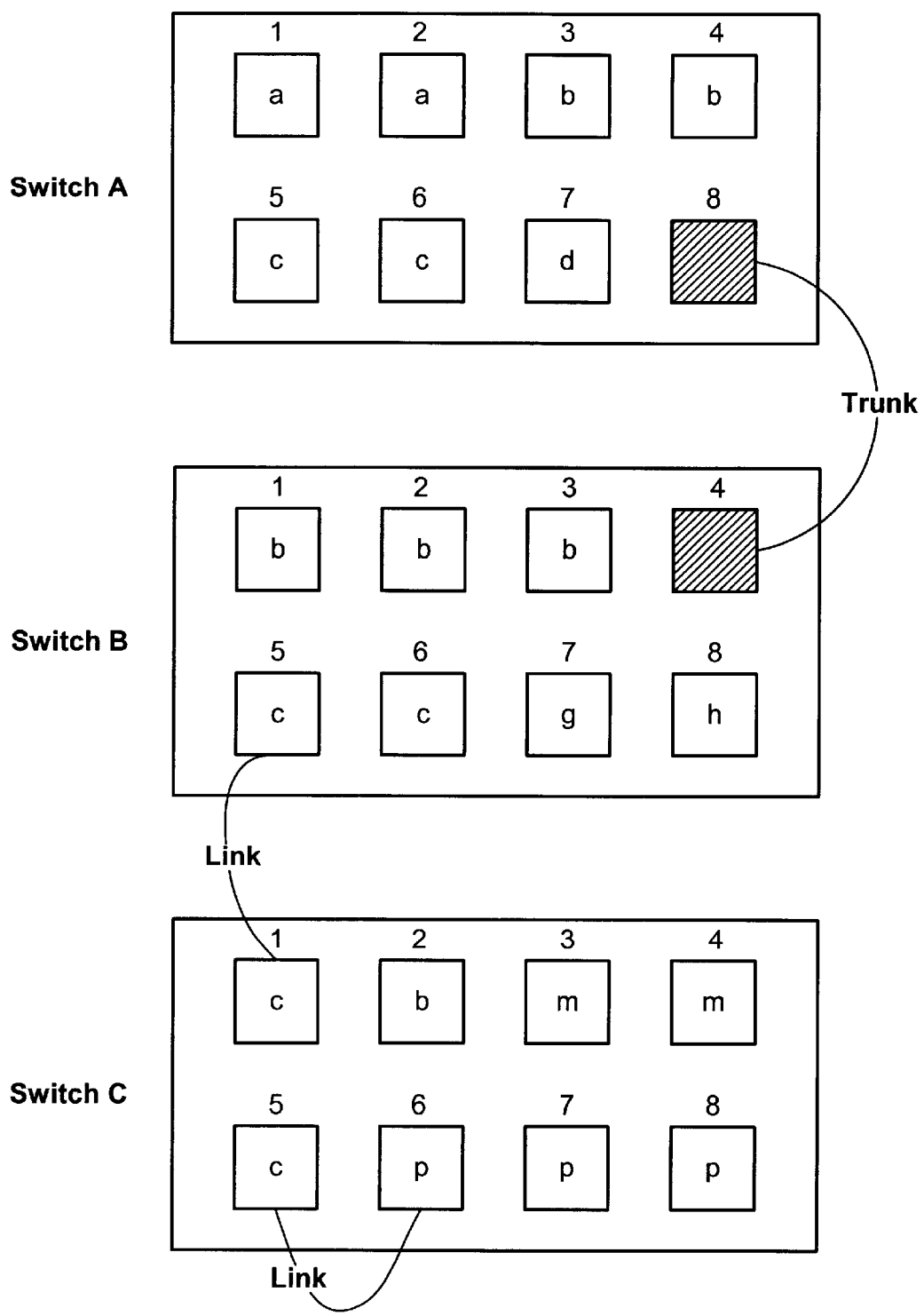

The table below illustrates the domain groupings depicted in FIG. 4:

TABLE 3

| Hub ID | Port | Local Domain | Global Domain |
|---|---|---|---|
| Switch A | 1 | z | |
| Switch A | 2 | z | |
| Switch A | 3 | y | gd_1 |
| Switch A | 4 | y | gd_1 |
| Switch A | 5 | x | gd_2 |
| Switch A | 6 | x | gd_2 |
| Switch A | 7 | W | |
| Switch A | 8 | | |
| Switch B | 1 | v | gd_1 |
| Switch B | 2 | v | gd_1 |
| Switch B | 3 | v | gd_1 |
| Switch B | 4 | | |
| Switch B | 5 | U | gd_2 |
| Switch B | 6 | U | gd_2 |
| Switch B | 7 | T | |
| Switch B | 8 | S | |
| Switch C | 1 | R | |
| Switch C | 2 | Q | |
| Switch C | 3 | P | |
| Switch C | 4 | P | |
| Switch C | 5 | R | |
| Switch C | 6 | 0 | |
| Switch C | 7 | 0 | |
| Switch C | 8 | 0 | |

A link domain refers to the domain used (either local domain or global domain) to identify link ports. A global domain always takes precedence over a local domain. Thus, if a port has a global domain, the global domain is the link domain. If a port only has a local domain, then the local domain is the link domain. The table below illustrates link domains for FIG. 4.

TABLE 4

| Hub ID | Port | Local Domain | Global Domain | Link Domain |
|---|---|---|---|---|
| Switch A | 1 | z | | z |
| Switch A | 2 | z | | z |
| Switch A | 3 | Y | gd_1 | gd_1 |
| Switch A | 4 | Y | gd_1 | gd_1 |
| Switch A | 5 | x | gd_2 | gd_2 |
| Switch A | 6 | x | gd_2 | gd_2 |
| Switch A | 7 | W | | W |
| Switch A | 8 | | | |
| Switch B | 1 | V | gd_1 | gd_1 |
| Switch B | 2 | V | gd_1 | gd_1 |
| Switch B | 3 | V | gd_1 | gd_1 |
| Switch B | 4 | | | |
| Switch B | 5 | U | gd_2 | gd_2 |

TABLE 4-continued

| Hub ID | Port | Local Domain | Global Domain | Link Domain |
|---|---|---|---|---|
| Switch B | 6 | U | gd_2 | gd_2 |
| Switch B | 7 | T | | T |
| Switch B | 8 | S | | S |
| Switch C | 1 | R | | R |
| Switch C | 2 | Q | | Q |
| Switch C | 3 | P | | P |
| Switch C | 4 | P | | P |
| Switch C | 5 | R | | R |
| Switch C | 6 | 0 | | 0 |
| Switch C | 7 | 0 | | 0 |
| Switch C | 8 | 0 | | 0 |

A circuit is comprised of all link domains that can communicate with each other without the assistance of a router. In FIG. 4, the following ports belong to common circuits:

TABLE 5

| Hub ID | Port | Local Domain | Giobal Domain | Link Domain | Circuit |
|---|---|---|---|---|---|
| Switch A | 1 | z | | z | circuit 1 |
| Switch A | 2 | z | | z | circuit 1 |
| Switch A | 3 | y | gd_1 | gd_1 | circuit 2 |
| Switch A | 4 | y | gd_1 | gd_1 | circuit 2 |
| Switch A | 5 | x | gd_2 | gd_2 | circuit 3 |
| Switch A | 6 | x | gd_2 | gd_2 | circuit 3 |
| Switch A | 7 | w | | w | circuit 4 |
| Switch A | 8 | | | | |
| Switch B | 1 | v | gd_1 | gd_1 | circuit 2 |
| Switch B | 2 | v | gd_1 | gd_1 | circuit 2 |
| Switch B | 3 | v | gd_1 | gd_1 | circuit 2 |
| Switch B | 4 | | | | |
| Switch B | 5 | U | gd_2 | gd_2 | circuit 3 |
| Switch B | 6 | U | gd_2 | gd_2 | circuit 3 |
| Switch B | 7 | T | | T | circuit 5 |
| Switch B | 8 | s | | s | circuit 6 |
| Switch C | 1 | R | | R | circuit 3 |
| Switch C | 2 | Q | | Q | circuit 7 |
| Switch C | 3 | P | | P | circuit 8 |
| Switch C | 4 | p | | P | circuit 8 |
| Switch C | 5 | R | | R | circuit 3 |
| Switch C | 6 | 0 | | 0 | circuit 3 |
| Switch | 7 | 0 | | 0 | circuit 3 |
| Switch C | 8 | 0 | | 0 | circuit 3 |

With these general concepts in mind, we now turn to illustrative examples showing why known prior art systems do not meet the industries, need for timely and accurate determination of network topology features.

As discussed above, prior art systems and methods have utilized source address table information in an effort to build accurate topology maps. For example, both the Black patent and the Orr patent allow for a centrally located apparatus to gather source address table information. However, both systems can generate incorrect topology maps if any of the following conditions are met:

(1) Some of the nodes or devices on the network use the same source address on a plurality of interfaces.

This is a very common situation on mid to large size networks. The majority of Sun UNIX hosts in existence use the same source address on all their interfaces. Also, some network devices will use a common source address on each interface to transmit proprietary management packets.

Figure 5:
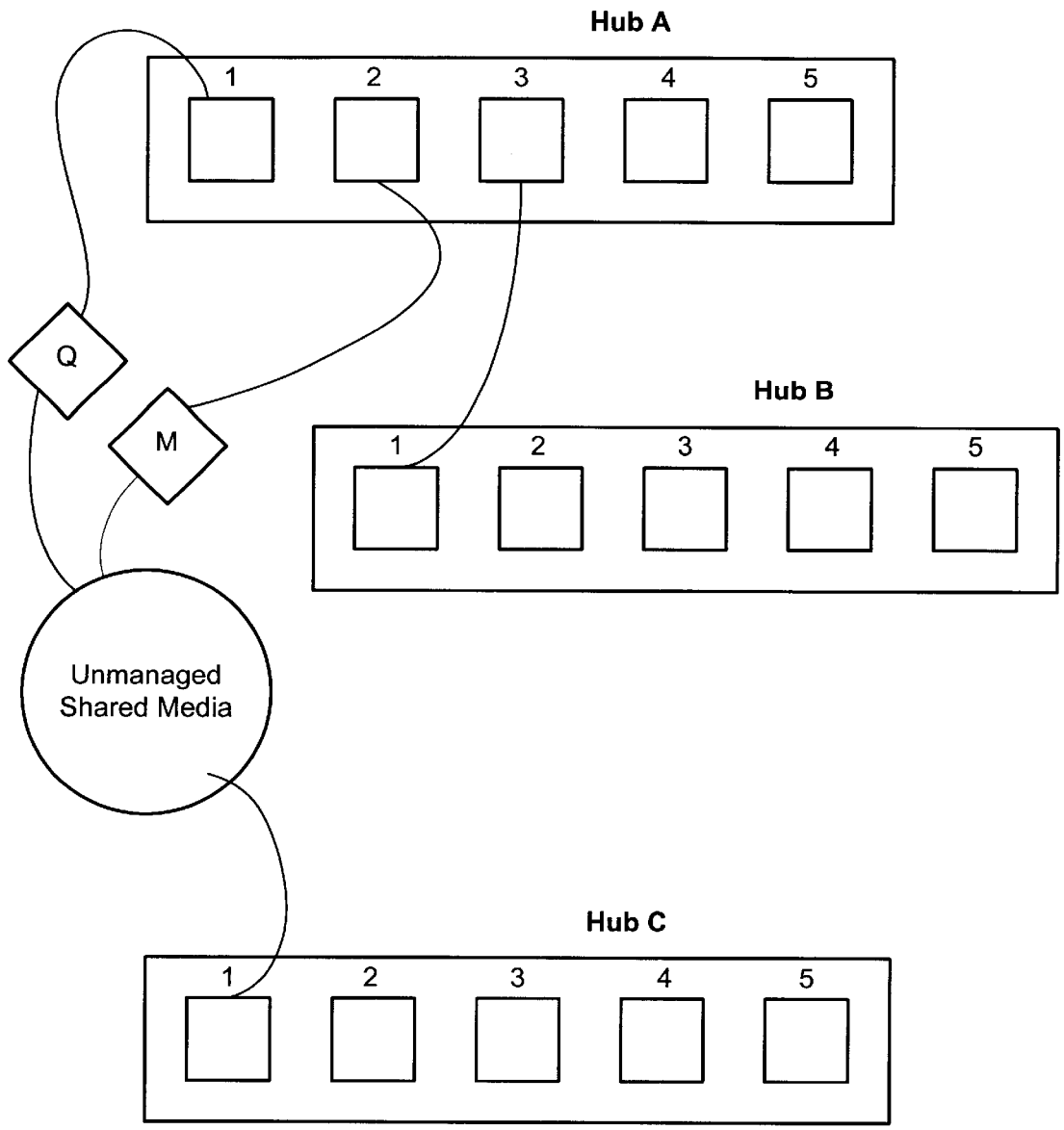

FIG. 5 illustrates why this can be a problem for methods that only rely on the source address table when creating a toplogy map. In this illustration, node Q (e.g., a Sun workstation) attaches to port 1 of managed hub A. Likewise node M (another Sun workstation) attaches to port 2 of managed hub A. Both nodes also attach to an unmanaged shared media hub. This configuration is fairly common where hub A represents a production network hub and the shared media hub belongs to a backup or management network segment. Hub A port 3 attaches to hub B port 1. Also the shared media hub attaches to port 1 of hub C.

As nodes Q and M communicate with nodes on hub B, hub B port 1 will record that it sees the source addresses of both node Q and node M. Likewise, as nodes Q and M communicate with nodes on hub C, hub C port 1 will record that it sees the source addresses of both node Q and node M. Herein lies the problem. Port 1 of hub B is a link port which connects hub A and hub B together, whereas port 1 of hub C is a node port through which an interface from node Q and an interface from node M enter the managed network. However, both ports look identical from a source address perspective relative to nodes Q and M.

As discussed above, the apparatus disclosed herein uses logical groupings to avoid the possibility of inaccurate-topology maps caused by the use of duplicate source addresses.

(2) Where networks are very dynamic.

Figure 6A:
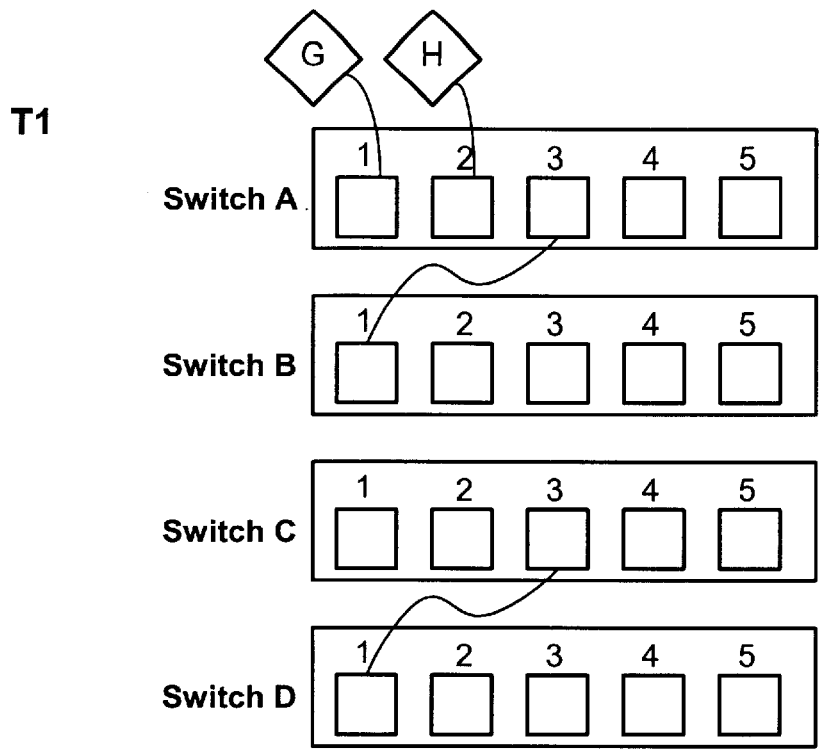
FIGS. 6a and 6b are schematic diagrams of device interconnections at two different points in time.
Figure 6B:
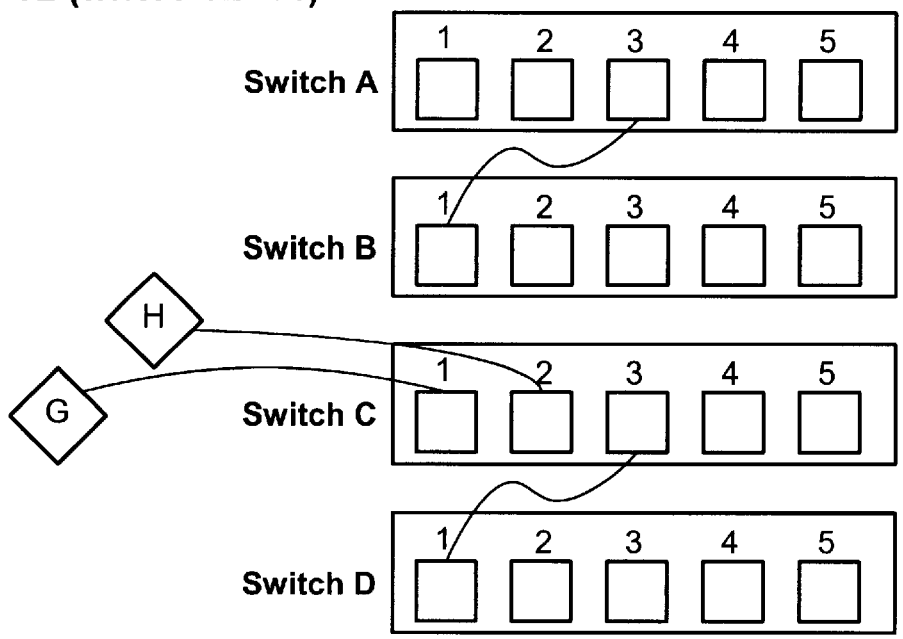

Devices, connections, and nodes are often added, deleted, and moved. When a worldwide network involves numerous network devices, it is impractical to download the source address tables from every device at once. In fact, many minutes if not hours can transpire between polling the first network device until the last device is polled. Thus, inaccurate information can be obtained because of the movement of devices during that time interval. FIGS. 6a and 6b illustrate the problem. At time 1 (T1) node G attaches to port 1 of switch A and node H attaches to port 2 of switch A. Switch A port 3 connects to switch B port 1. Meanwhile, switch C port 3 connects to port 1 of switch D.

At time T2 (some time after T1), node G is moved to port 1 of switch C and node H is moved to port 2 of switch C. The four hubs have maintained their previous link connections. In this situation, an incorrect topology map may be generated if the source addresses from switch A and switch B are polled at a time at or before time T1 and switch C and switch D are polled at a time at or after T2. In this situation, switches A, B, C, and D would appear to be interconnected with each other because each switch will show entries for source addresses for node G and node H (switches B and D will see the nodes on the link ports.)

The ability of a topology map to remain current with adds, moves, and changes is of critical importance to the end users of the technology. Many problems that a network administrator must deal with follow changes made to the network infrastructure. The faster a topology map can accurately represent those changes, the more useful it is to the industry. In extremely dynamic environments with a long polling interval, a topology map using prior art methods could maintain a degree of inaccuracy in perpetuity.

As discussed above, the invention disclosed herein uses filters to remove the possibility of problems due to device and node movement throughout the infrastructure.

(3) Where nodes using the same address source on a plurality of ports are connected to switches using VLANs and trunk ports.

Figure 7:
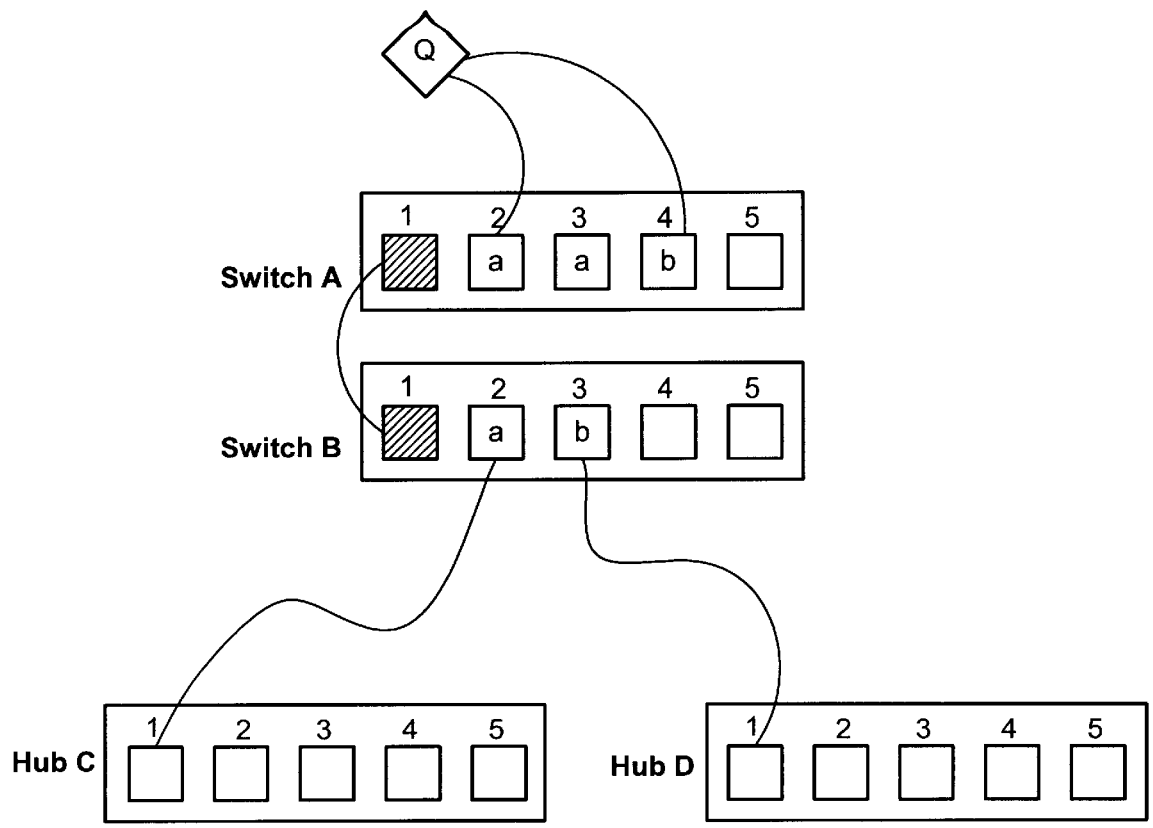
FIG. 7 is still another schematic diagram showing interconnections between devices.

Prior art systems do not account for certain common network configurations using trunk ports, expansion ports, and trunk channels. The problem is exacerbated when nodes using the same source address on a plurality of ports are connected to switches using VLANs and trunk ports (another common scenario). FIG. 7 illustrates this problem. In this scenario, node Q attaches to port 2 of switch A. Port 2 of Switch A belongs to VLAN a. Node Q also attaches to port 4 of switch A. Port 4 belongs to VLAN b. Switch A and switch B are connected via a trunk port (e.g., Cisco ISL, Synoptics 28k expansion, etc.) Port 2 of switch B connects VLAN a to port 1 of hub C. Therefore, port 1 of hub C could see source address Q. Port 3 of switch B connects VLAN b to hub D. Thus, hub D port 1 also could see source address Q. As in the first example, these ports appear identical from a source address perspective relative to Q, which could result in topology inaccuracies. The apparatus disclosed herein uses logical groupings to avoid this problem.

(4) Where source address tables experience aging problems

Another problem is that source address tables sometimes experience aging problems (e.g. they don't age at all). The approach disclosed by the Black patent requires selecting a single device and recursively traversing the topology. The method disclosed by Orr et al. requires iteratively comparing every port on every device to every other port on every other device. Thus, both methods use a brute force, physical level approach to resolving links. Any ambiguity caused by any of the situations previously discussed can be exaggerated. The present invention uses filters to obviate this problem.

(5) Where the source address tables for devices in network environments age at different frequencies.

Figure 8:
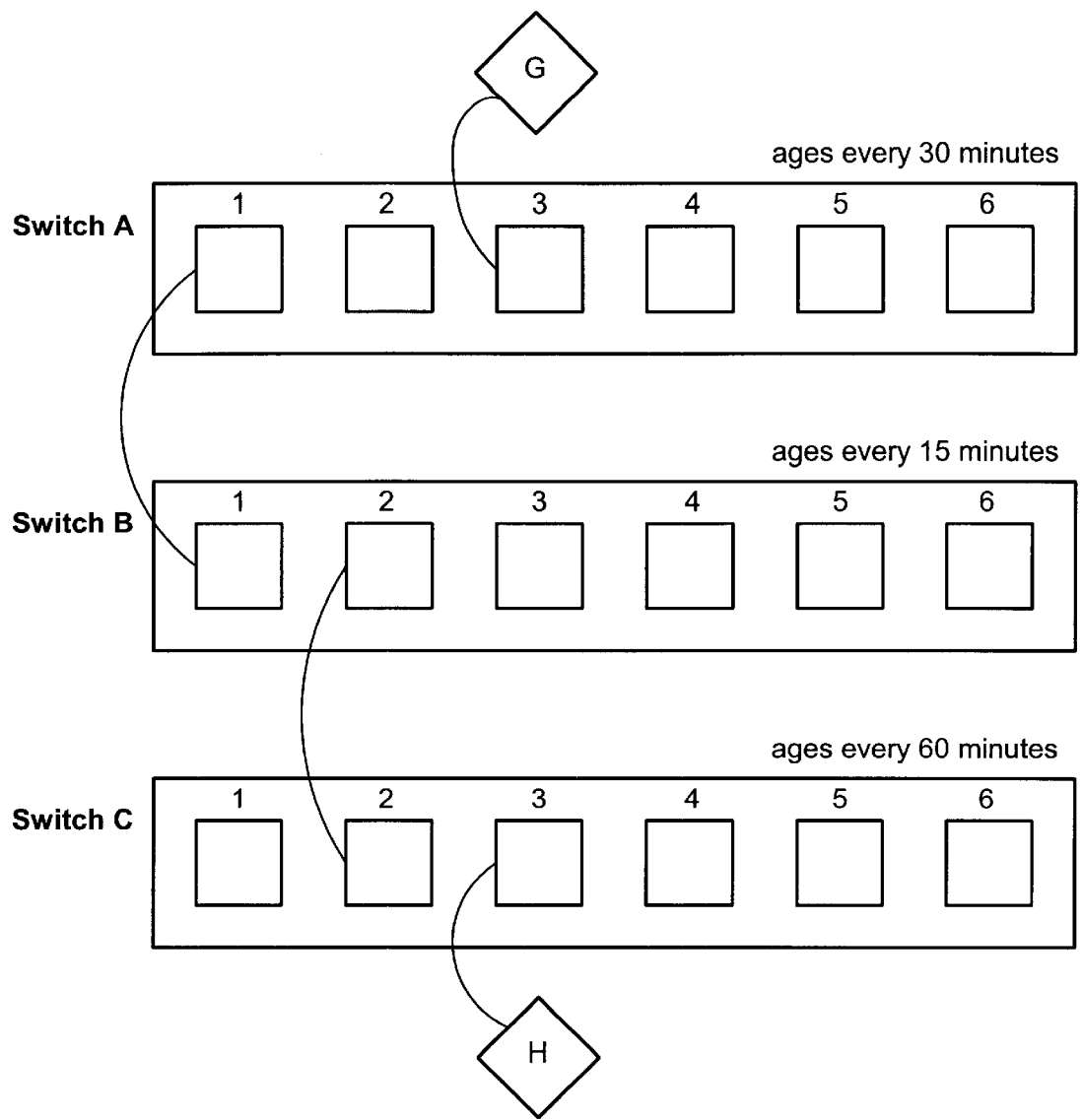
FIG. 8 is yet another schematic diagram depicting interconnection between devices.

This can cause erroneous links to be drawn when using prior art systems and methods. FIG. 8 illustrates this problem. In this illustration, all three switches will maintain a record of source addresses G and H up to fifteen minutes after they finish communicating with each other. However, starting from fifteen minutes after they are done up through thirty minutes, only switch A and switch C will have a record of the two source address (since the record on switch B will have aged out). Thus, it could appear that switch A directly connects to switch C during this fifteen minute period. Only switch C will contain a record for both G and H starting thirty minutes up to one hour after nodes G and H cease communicating. In this case, it could appear that both nodes G and H attach directly to switch C.

In this example, the source address tables could lead to incorrect topology maps for a period of 45 minutes. In many network environments, the time can be much longer. The amount of time in which the source tables are inaccurate can be calculated by taking the highest aging time (60 minutes in the example) and subtracting from the lowest aging time (15 minutes). In some circumstances, inaccuracies can occur for hours after a pair of nodes cease communicating. Also, in a large, network, devices start and stop communicating throughout the day. With different aging times, the complexity is magnified significantly. The apparatus and method discussed herein uses a continually updated list of the history of source addresses to resolve this problem.

Figure 9:
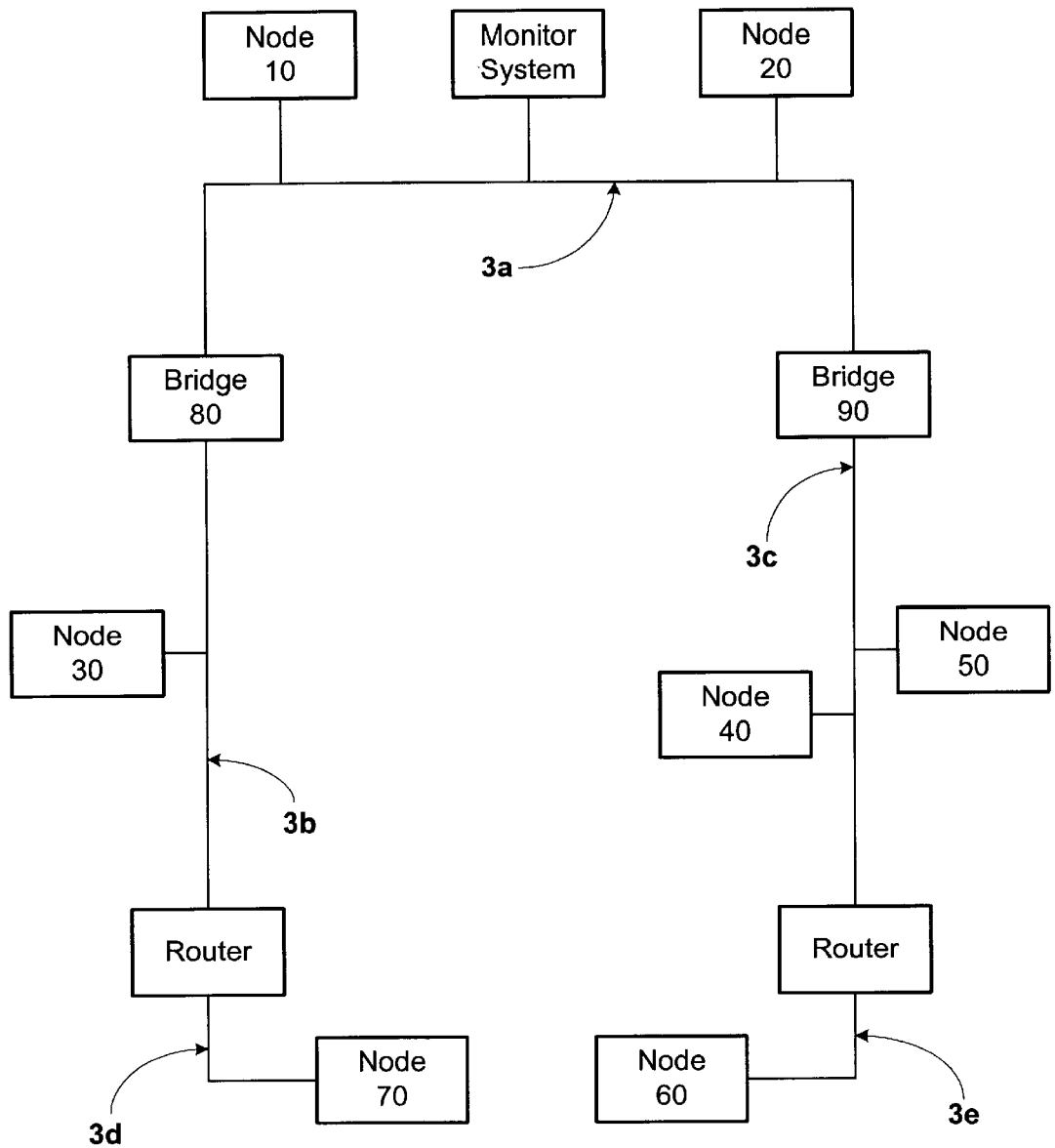
FIG. 9 is a schematic diagram of a sample network including the monitoring system of the present invention.

FIG. 9 depicts a sample network which includes the monitoring system of the present invention. As shown in this illustrative network, nodes 10 and 20 are connected to a first network segment 3a. The monitoring system of the present invention is also connected to network segment 3a. A bridge device 80 interconnects network segments 3a and 3b. Similarly, bridge device 90 interconnects network segments 3a and 3c. As shown, each of network segments 3b and 3c also include attached nodes. Finally, router devices interconnect network segments 3b and 3d, and 3c and 3e, respectively.

The monitoring system of the present invention includes a computer system interconnected to the network. The computer system includes a processor, a keyboard, a display, a printer, memory, and an interface to the computer network. The memory contains the software which operates the monitoring system of the present invention. It also stores the database collected by the monitoring system. While the monitoring system is shown in a central location in the illustrative FIG. 9, it is understood that the components of the monitoring system could be connected at various points within a given network.

Figure 10:
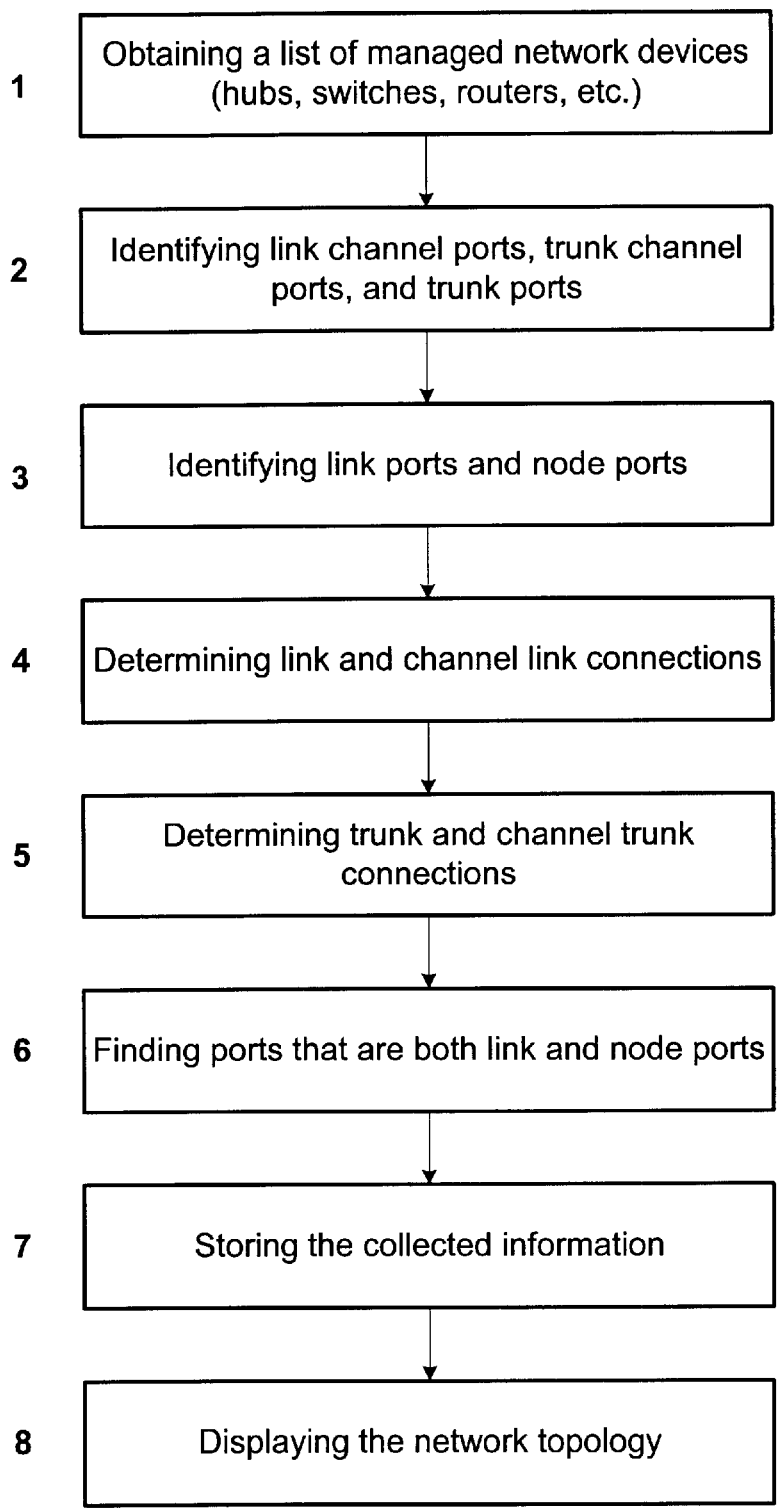
FIG. 10 is a flowchart depicting the preferred steps in creating an accurate topology map according to the present invention.

FIG. 10 illustrates the preferred steps involved in creating an accurate topology map, according to present invention. These preferred steps include:

1. Obtaining a list of managed devices (hubs, switches, routers, etc.)
2. Identifying link channel ports, trunk channel ports, and trunk ports
3. Identifying link ports and node ports
4. Determining link and channel link connections
5. Determining trunk and channel trunk connections
6. Determining ports that are both link and node ports
7. Storing the collected information
8. Displaying the network topology Step 1 is common knowledge in the art.

Step 2 is performed by querying the managed devices, for example through SNMP queries, automated telnet scripts, etc. (Simple Network Management Protocol (SNMP) is a well defined network management protocol that allows for obtaining information from SNMP devices; automated telnet scripts represent a standard protocol used to provide terminal access to a host in a TCP/IP network.) Most devices keep track of which ports are used as link channel ports, trunk channel ports, and trunk ports.

Figure 11:
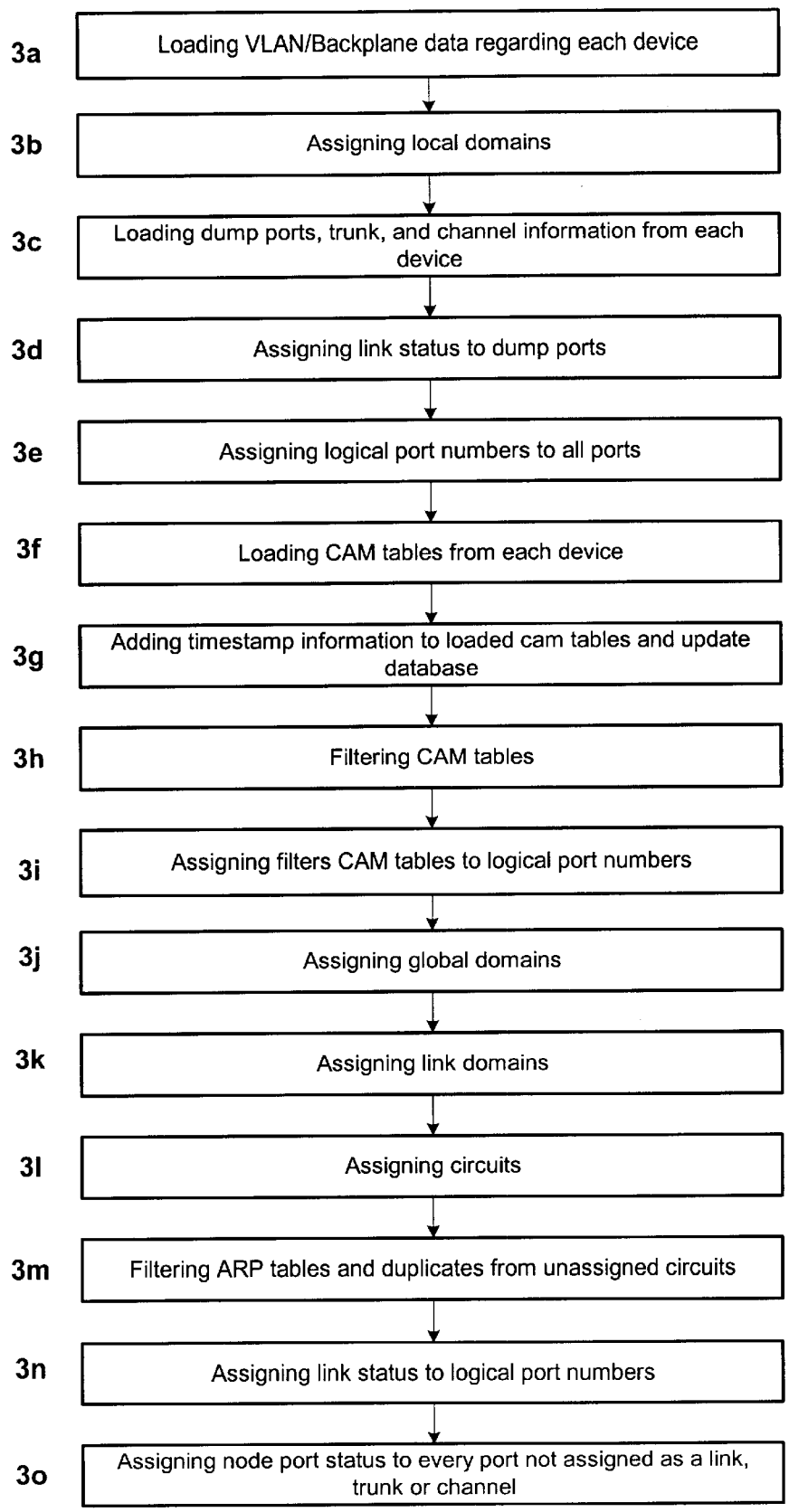
FIG. 11 illustrates the preferred method steps for identifying link ports according to the present invention.

Step 3 involves the novel method depicted in FIG. 11. The preferred steps as depicted in FIG. 11 are as follows:

3a. Gathering information
3b. Assigning local domains
3c. Loading dump port, trunk, and channel information from each device
3d. Assigning link status to dump ports
3e. Assigning logical port numbers to all ports
3f. Loading cam tables from each device
3g. Adding timestamp, information to loaded cam tables and update database
3h. Filtering cam tables
3i. Assigning filtered cam tables to logical port numbers
3j. Assigning global domains
3k. Assigning link domains
3l. Assigning circuits
3m. Filtering ARP and duplicates from unassigned circuits
3n. Assigning link status to logical port numbers
3o. Assigning node port status to every port not assigned as a link, trunk, or channel.

In step 3a, information is gathered. In order to perform every one of the preferred method steps the following information is gathered: VLAN/backplane assignments for every device, device and node ARP tables, device interface information, number of interfaces for each managed device and node, and physical addresses (source address) for each managed node and device. (As discussed below, only subsets of this information are needed if the monitor system is only performing certain of the substeps of step 3.) This information can be retrieved via SNMP queries, automated telnet scripts: etc. Step 3b involves assigning a local domain to ports of the devices in accordance with the description of determining local domains described above. Step 3c can also be performed via SNMP queries, automated telnet scripts, etc. In step 3d, every port that is a dump port is a known link port. Therefore, each dump port is tagged as a link port at this step. Step 3e involves assigning logical port numbers according to the method of assigning logical port numbers to channel ports described above.

In step 3f, the source address tables of each of the devices on the network are polled and loaded. This step can be performed via SNMP queries, automated telnet scripts, etc.

A problem when identifying links is the differences in polling times between two devices. Medium to large size networks can involve dozens or hundreds of devices scattered throughout the world. It is often infeasible to load the cam tables from every device at exactly the same time. In fact, many hours may transpire between cam table loading. Thus, if switch A's cam table is loaded at time T1 and switch B's cam table is loaded at TI+2 hours and the cam table aging for both switch A and switch B is 15 minutes, the source addresses recorded on switch A probably belong to different communication exchanges than with switch B. Also, if a device was moved from switch A to switch B, it will inaccurately show up in both switch A and switch B.

In order to alleviate this problem, devices may be grouped such that in step 3f related devices are polled together and/or within a short period of time of each other.

Related devices can be located by any of these methods:
(a) Every device containing a recent source address entry contained in a given router's ARP table can be considered to be related;
(b) The cam tables of every device can be cross-examined to determine if any source addresses from one device is seen within another. If so, they are related.
(c) If the IP address of two devices belong to identical routers, the devices are related.
(d) If the IP address of two devices belong to the same LAN, then they are related.
   (d)(1) To find IP addresses of the same LAN, query each router for the IP address, network mask, and interface type for each router interface;
   (d)(2) Calculate the IP Network based upon each IP Address and network mask; and
   (d)(3) For every router pair in which an interface is a LAN type (e.g. csma/cd, token ring, FDDI, etc.) and the interfaces belong to the same IP network then all LAN interfaces from both routers are part of the same LAN.

In step 3g, timestamp information is added to the source address historical database, and the database is updated. Three timestamps are kept in the database for each device, physical port, source address combination. The first timestamp (first seen) is the time that the source address was first found on the device's port. The second timestamp (last seen) is the time that the source address was last found on the port. The third timestamp, (last poll) is the time that the source address table was last checked. The following table illustrates sample source address history entries

TABLE 6

| Hub ID | Port | Source Address | First Seen | Last Seen | Last Poll |
|---|---|---|---|---|---|
| Hub A | 1 | s1 | 10/01/98 10:36:45 | 11/21/98 03:21:18 | 12/03/98 08:32:21 |
| Hub A | 1 | s2 | 10/01/98 10:36:45 | 12/01/98 04:43:28 | 12/03/98 08:32:21 |

TABLE 6-continued

| Hub ID | Port | Source Address | First Seen | Last Seen | Last Poll |
|---|---|---|---|---|---|
| Hub A | 1 | s3 | 11/21/98 05:21:23 | 12/03/98 08:32:21 | 12/03/98 08:32:21 |
| Hub A | 1 | s4 | 10/01/98 10:36:45 | 12/01/98 04:43:28 | 12/03/98 08:32:21 |
| Hub A | 2 | S5 | 11/21/98 O5:21:23 | 12/03/98 08:32:21 | 12/03/98 08:32:21 |
| Hub A | 2 | S6 | 10/01/98 10:36:45 | 12/03/98 08:32:21 | 12/03/98 08:32:21 |
| Hub A | 3 | s1 | 11/21/98 05:21:23 | 12/01/98 04:43:28 | 12/03/98 08:32:21 |
| Hub A | 3 | s7 | 10/01/98 10:36:45 | 12/03/98 08:32:21 | 12/03/98 08:32:21 |
| Hub A | 3 | s8 | 10/01/98 10:36:45 | 12/01/98 04:43:28 | 12/03/98 08:32:21 |

An examination of this table shows, e.g., that source addresses s1–s4 have been found at hub A, port 1 during the past several polls. Moreover, the source addresses s1, s2, and s4 were not seen on hub A port 1 during the last poll (12/03/98 at 08:32:21). Note that the above table does not display all of the information loaded and/or assigned by the monitoring system at this point in the preferred method. For example, VLAN/backplane information, dump port information, trunk port information, link channel port information, trunk channel port information, logical port information, and local domain information for each managed device is not displayed in the above table but would have been loaded by the monitoring system at this point as per steps 1–2 and steps 3a–3e.

As described above with reference to FIGS. 6a and 6b, network environments for most companies are very dynamic. Devices are constantly moved from one location to another. Every time that devices are moved, the source address tables may show that the source address of the device is seen at incorrect locations.

The cam table timestamps are used to filter data that could otherwise produce inaccurate results. Specifically, the present invention solves this problem by identifying source addresses where:

$$(\text{last seen}-\text{first seen}) < \text{cam aging time}$$

Any source address matching this criteria will not be used in link identification. That is, if any source address on a given port meets this criteria, this source address is filtered from all ports.

Also, individual source address entries where the (last poll–last seen)>cam aging time will not be used when calculating links. Thus, assume cam aging time is eight hours and node A moves from port X to port Y. For the first eight hours, all source address entries related to node A will not be used when identifying link ports and connections because (last seen–first seen)<cam aging time for port Y during this time. Thus, the entries for node A on both port X and port Y will be filtered during the first eight hours after the move. However, after eight hours, only the individual entry for port X will no longer be used. The entry for Y will be used because (last poll–last seen)>cam, aging time occurs only for port X after the eight hours has transpired. Thus, once a device has moved, the system will accurately identify its new position and use it accordingly.

Alternatively, the system and apparatus of the present invention may filter the cam table based upon the polling time difference+cam table aging time instead of just the cam table aging. This will remove problems related to movement where related devices are not polled together in step 3f. For example, if it takes three hours to download the source tables for every device and the longest cam age time for the devices is two hours, the cam can be filtered for devices where the last seen–first seen is less than five hours (three hours polling+two hours cam aging time.) If every entry related to as source address is greater than five hours, it could not have been moved and there would have been time for the cam tables to age.

Likewise, individual entries where (last poll–last seen)> (polling time difference+cam aging time) can be filtered if the polling time difference among related devices is significant (e.g., more than five minutes).

Cam table aging time can often be obtained via an SNMP query and/or an automated telnet script. Alternatively, cam table aging can be derived from the historical cam database discussed above by finding the minimum result of (last seen–first seen) for each VLAN on each device. An artificially high number can be assumed (for example, 16 hours) if no cam table aging information is available or can be derived.

Some cam tables never age their source addresses. This can cause significant problems when properly identifying links. Thus, in the preferred embodiment, all cam table entries from non-aging cam tables are also filtered. Non-aging cam tables can often be identified by querying the device via SNMP or telnet. Cam tables that do not age can be derived via the historical database discussed previous. For each port belonging to a common local domain on the device, the last seen is examined to see if it is the same as the last poll. If every source address ever seen on the VLAN has a last seen timestamp equal to its last poll timestamp, this implies the cam table may not be aging.

Yet another solution to non-aging cam tables is to periodically issue cam refresh commands. Most devices allow for a manual command to be-issued which will completely clear the cam table, i.e., cause it to immediately age. If a device is not automatically aging its cam table, the monitoring system of the present invention can periodically send a cam refresh command to the device, once the device is polled, an analysis of the last poll to the last seen timestamps in the cam database can confirm whether or not the did clear the cam table.

An alternative filter may also be applied to non-aging cam tables. In this alternative filter, all source addresses seen on multiple local domains on the non-aging hub can be filtered (instead of the entire table).

In step 3i, the filtered cam entries are assigned to the logical ports that map to the physical ports in the cam historical database as discussed above.

In step 3j, global domains are assigned. In the preferred embodiment, global domains are assigned by utilizing one or more of the following numbered alternative methods:

1) Querying each hub for trunk port membership.

Many devices such as the Synoptics 28k keep track of all hubs that are interconnected via trunk ports. This list can be obtained via an SNMP query and/or telnet. Every local domain representing a VLAN seen on two or more devices in this list belongs to a global domain. For example, consider the situation in which switch A, switch C, and switch F are determined to be interconnected with each other via trunk ports. If VLAN b is seen on switch A and switch F, then the local domain mapping to VLAN b on both of these switches belong to one common global domain.

2) Identifying devices interconnected via trunk ports by using known single network source addresses.

If a source address is known to belong to only one network or circuit, every device that (a) contains a cam table entry for the source address (after filtering movement); and (b) has a trunk port; and (c) has at least one identical VLAN is interconnected with each other via the trunk ports. Thus, global domains can be assigned as discussed above in the Synoptics 28k example.

3) Identifying global domains by identifying any device which has a trunk port and has a vlan with the same name as another device with a trunk port.

Of course, this method is not as reliable as 1) and 2) above. Two devices with trunk ports and identical vlan names do not have to be interconnected by definition. However, it may be considered when the previous two methods fail to identify all interconnected hubs.

4) Manually entering information regarding which hubs are interconnected with trunk ports.

Once interconnected hubs are identified, global domains are assigned according to the method described above.

Sometimes a known single network device may not be known. In this case, a statistical method can be utilized to identify devices interconnected via trunk ports and/or channel trunk ports as follows:

5) Identifying devices interconnected via trunk ports by
   a) identifying devices that have trunk ports and/or channel trunk ports AND share at least one common VLAN definition; and
   b) share a plurality of source addresses relative to the common VLANs and/or trunk ports.

In step 3k, link domains are assigned to each logical port number according to the method described above.

Figure 12:
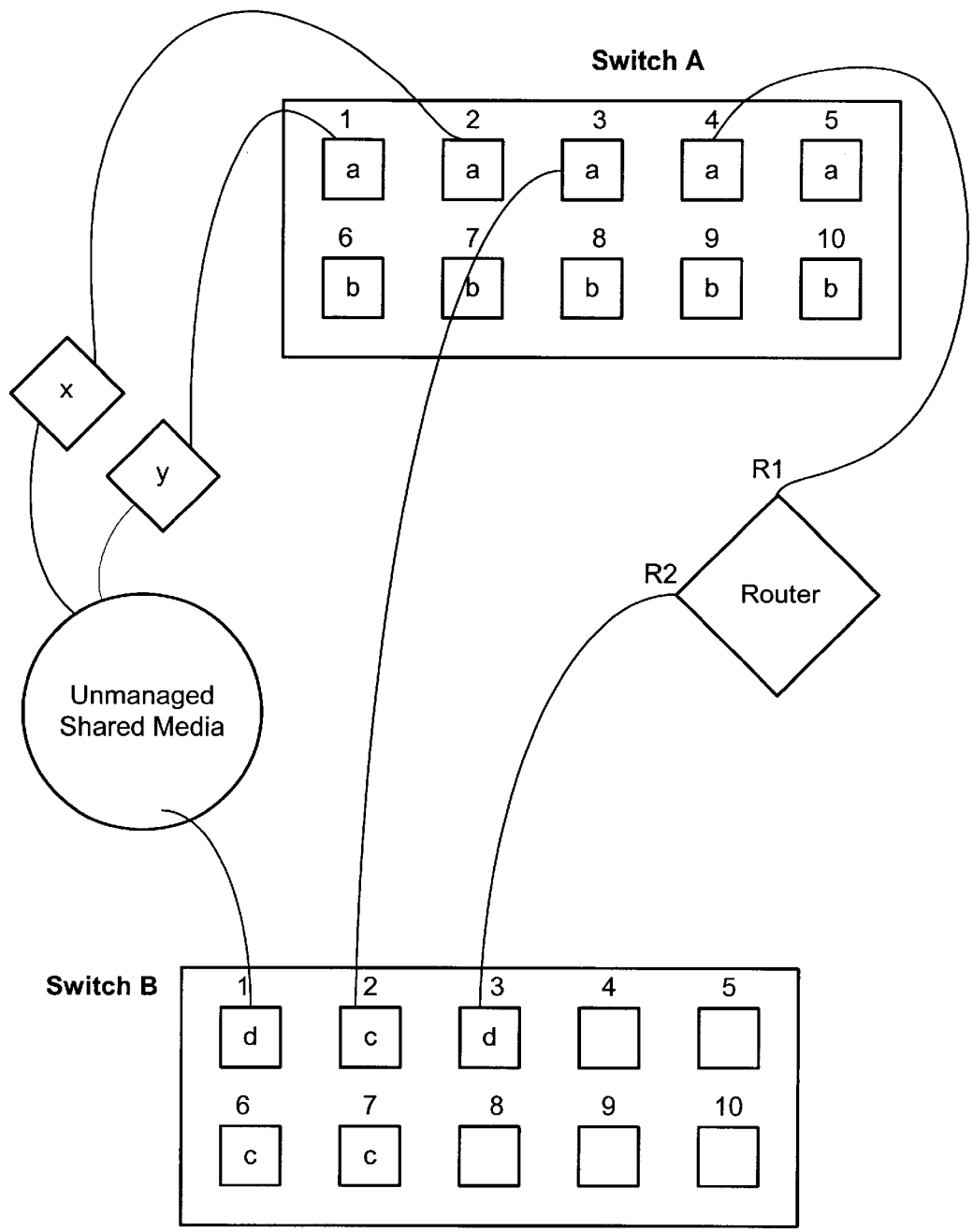
FIG. 12 is a schematic diagram illustrating device interconnections.

In step 3l, circuits are assigned to link domains. The assignment of circuits is perhaps the most critical step in accurately identifying links. FIG. 12 illustrates the importance and method of circuit assignment. FIG. 12 depicts an example of a common network configuration used to separate backup networks from production networks. In this example, node X has two interfaces such that both interfaces use the same source address (common for Sun UNIX hosts). Node Y also does the same. One interface of node X connects to port 2 of switch A on VLAN a. One interface of node Y connects to port 1 of switch A on VLAN a. Port 2 of switch B will record seeing both source addresses X and Y on port 2 via the link between switch A and switch B. The second interface on node X connects to an unmanaged shared media hub. The second interface on node Y also connects to an unmanaged shared media hub. Port 1 of switch B will record seeing both source addresses X and Y on port 1. The problem lies herein. Port 1 of switch B is a node port where the second interfaces of nodes X and Y attach to the managed infrastructure. Port 2 of switch B is a link port connecting switch A and switch B. Yet both appear identical relative to source addresses X and Y.

In the preferred embodiment of the present invention, circuits are assigned to link domains by utilizing one or more of the following numbered steps:

1) Identifying every router that uses unique source addresses on its interfaces.

For example, in FIG. 12, one router interface uses R1 as its source address. The second interfaces uses R2 as its source address. The next step is to verify that R1 and R2 do not overlap. If none of the link domains contain a reference for both R1 and R2, then R1 and R2 do not overlap. If both of these conditions are affirmative, then every link domain containing R1 belongs to a common circuit. Every link domain containing R2 belongs to a common circuit (that is different from the R1 circuit) Thus, link domains Z (comprising ports 1–5 of switch A) and Y (comprising port 1 of switch B) belong to the circuit containing R1 while link domain X (comprising ports 1 and 3 of switch B) belongs to the circuit containing R2. Link identification is performed one circuit at a time. The link ports within each link domain of each circuit are determined independently of the other circuits.

The circuit assignment resolves the problem illustrated in FIG. 12. Port 2 of switch B will be examined relative to ports 1–5 of switch A since they all belong to circuit R1. Port 2 of switch B will be correctly identified as a link port because it sees the source address from port 1 and port 2 on switch A. Port 1 of switch B will be appropriately identified as a node port since it does not contain multiple source addresses seen on a plurality of ports within another single link domain.

2) Identify link domains that share multiple source addresses of NIC (Network Interface card) cards not belonging to SUN UNIX hosts or devices.

The manufacturer of NIC cards can be identified by the first 3 bytes of the source address stored in the cam table. If two link domains share many different source addresses from a variety of manufacturers other than SUN, and the source addresses do not belong to a managed device interface (source addresses for devices are collected in step 3a) then the two link domains have a high probability of belonging to a common circuit.

3) Utilizing network/physical address map tables such as a router ARP table.

In this step, circuits are assigned to link domains by examining the network layer addresses (e.g., IP, IPX, etc.) corresponding to the source addresses in the cam tables. For example, if one link domain has three source addresses belonging to IP Network 132.145.210.000 and another link domain has five source addresses belonging to IP Network 132.145.210.000, then there is a high degree of probability that the two link domains belong to the same circuit. In the preferred embodiment, a verification is performed by checking to see if any router interface belongs to 132.145.210.000.

4) Filtering source addresses from router ARP tables that are seen on multiple router interfaces.

The remaining source addresses are then assigned to one common circuit. While this method is less reliable, it may be necessary in rare instances when method steps 1)–3) can not be employed.

5) Filtering source addresses seen on two local domains on any one switch or bridge.

In this step, the cam tables of every switch and bridge in the network are queried, and all source addresses seen on two local domains on any one switch or bridge are filtered. The remaining source addresses are then assigned to one common circuit.

6) Identifying every device that has at least one interface with a unique source address.

The SNMP standard MIB defines a query in which the number of interfaces for the managed device can be obtained. The standard MIB also defines a query to obtain the source address for each interface. Thus, it can easily be determined if a device uses a unique source address per interface. If an interface has a unique source address, that source address can be seen on only circuit. Thus, every link domain containing the source address must belong to a common circuit.

7) Utilizing set theory for devices that have multiple interfaces.

For example, if device X uses the same source address for two interfaces then one can determine that every link domain containing source address X can only belong to one of two circuits. Assume device Y contains three interfaces each using the same source address. If Y is seen on every link domain containing X, then link domains that only contain Y probably belong to a common circuit.

Depending on the topology of the network, one, two, several, or all of the preceding methods of determining circuits may be utilized.

On rare occasions, it may be possible that certain link domains can not be assigned to a circuit. The source addresses on these link domains will need to be filtered to ensure that they are accurately integrated into the topology map. In Step 3m, two filtering steps are preferably utilized:

(1) Filtering each source address seen on two different interfaces of a router ARP table;

(2) Filtering each source address seen on two different circuits as assigned in step 3l. For example, if circuit 1 contains source address s1, s2, & s3 and circuit 2 contains s2, s4, & s5 then s2 will be filtered from every link domain that does not yet have a circuit assignment.

In Step 3n, link status to logical port numbers are assigned. In the preferred embodiment, step 3n includes:

(a) selecting a circuit;

(b) making a list (list 1) of each link domain belonging to that circuit;

(c) adding all unresolved circuit link domains to list 1;

(d) selecting a link domain from list 1;

(e) selecting a logical port on the selected link domain that has two or more source addresses;

(f) if any link domain in list 1 has two or more ports that have source addresses seen on the logical port selected in step (e), tagging the logical port selected in step (e) as a link port;

(g) repeating steps (e) and M for every logical port in the link domain that has two or more source addresses;:

(h) repeating steps (d) through (g) for every link domain in list 1;

(i) if a non-circuit domain from list 1 was assigned a link, assigning that link domain to the currently selected circuit and removing it from the unassigned circuit list;

(j) repeating steps (a) through W for each circuit.

Figure 13A:
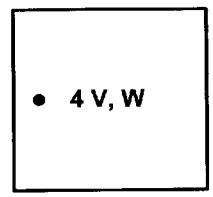
FIGS. 13(a) and 13(b) are schematic diagrams depicting lists of link domains.
Figure 13A:
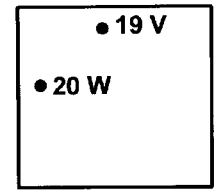

The method of preferred method step 3n, assignment of link ports, is illustrated by FIGS. 13(a) and (b). FIG. 13(a) shows two link domains Y and Z. The numbers refer to logical ports and the letters refer to source addresses in the link domains Y and Z. The two link domains depicted in FIG. 13(a),:represent the list provided by substeps (a)–(c). Selecting logical port 4 of link domain Y according to substeps (d) and (e), and performing the substep (f) reveals that logical port 4 is a link port that is, it contains source addresses that are seen on a plurality of ports in link domain Z.

Figure 13B:
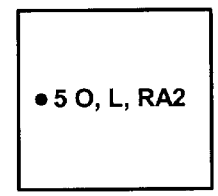
Figure 13B:
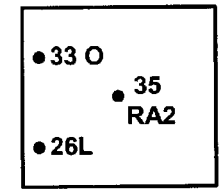

FIG. 13(b) shows two other link domains Y and Z. Again, the numbers refer to logical port numbers and the letters refer to source addresses. The two link domains depicted in FIG. 13(b) represent the list provided by substeps (a)–(c) of step 3n. Applying substeps (d)–(f) of step 3n reveals that logical port 5 of link domain Y is a link port; that is, like logical port 4 of link domain Y in FIG. 13(a), it contains source addresses seen on a plurality of ports in link domain Z. Because in the illustrative examples of FIGS. 13(a) and 13(b) there was only one logical port number having two or more source addresses (see step (e)), steps (g)–(i) have also been completed. Steps (a) W are then repeated for each circuit until are link ports have been identified.

In Step 3o, node port status is assigned to every port that was not assigned as a link port, trunk port, or channel port.

At this stage, in addition to all of the other information that has been loaded and/or assigned for the ports of each managed device on a given network by the monitoring system at this point in the preferred method (i.e., VLAN/ backplane information, local domain assignments, logical port number assignments, source address table information, global domain assignments, link domain assignments, and circuit assignments), every port has also been assigned a type field (trunk, link, channel, or node). The next step depicted in FIG. 9 is determining link and channel link connections between the ports.

Connections between devices are determined one circuit at a time by utilizing the method steps of Step 4:

4a. Selecting a circuit from the complete circuit list;
4b. Selecting a link domain in the circuit (from step 3k);
4c. Selecting a source address on the link domain chosen in step 4b from a link port (tagged in 3n);
4d. Selecting a source address on the chosen link domain from a node port;
4e. Identifying all link domains containing the source address from step 4c and the source address from 4e on 10 different ports;
4f. Sorting all link domains until all sorted;
4g. Assigning connections to each link domain according to sort order;
4h. Repeating steps 4c–4g for each link port on the chosen link domain;
4i. Repeating steps 4b–4h for each link domain in the circuit;
4j. Repeating steps 4a–4i for each circuit.

Figure 14:
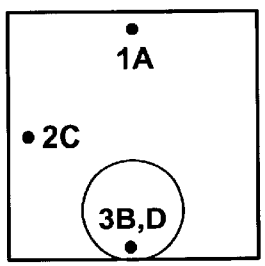
FIG. 14 is a schematic diagram illustrating information known about a sample circuit containing five link domains.
Figure 14:
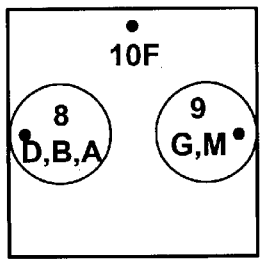
Figure 14:
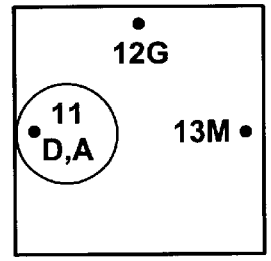
Figure 14:
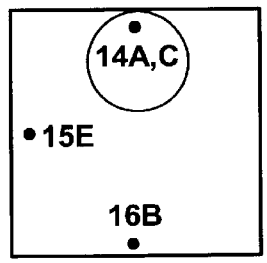
Figure 14:
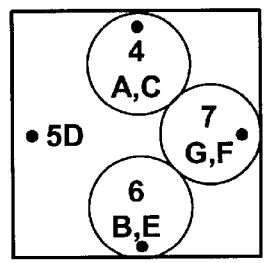

In step 4a, all the link domains belonging to a single circuit are selected. FIG. 14 illustrates the information known about a sample circuit containing 5 link domains (LD1–LD5). Each link domain is represented by a square. Within each square is a representation of a logical port number and the filtered source addresses associated with that logical port number. For example, in link domain 1 (LD1) logical port 1 has a source address entry for node A, logical port 2 has an entry for C, and logical port 3 has entries for nodes B & D. In step 3, node ports and link ports were identified. In FIG. 14, link ports are represented by enclosing their respective logical port numbers within a circle. Thus, LD1 logical port 3 is a link port, LD2 logical ports 8 & 9 are link ports, and so on only node ports and link ports are represented in FIG. 14, as trunks and channel trunks are ignored in step 4 (their connections are resolved in step 5).

In step 4b, a link domain from the circuit group is selected. For example, suppose that LD1 was selected. Step 4c involves selecting a source address from any link port within the chosen link domain. There are two source addresses on link port 3 (B & D). As an example, assume source address B was selected. Thus, source address B will be referred to as the link selection for this iteration of step 4.

In step 4d, a source address from the chosen link domain (LD1) from a node port is selected. In the example illustrated in FIG. 14, there are two node ports we can choose from: ports 1 and 2. Assume that source address A is chosen from port 1. Thus, source address A will be referred to as the node selection for this iteration of step 4.

In step 4e, all link domains that contain both the link selection and the node selection on two different ports are selected. In the example illustrated in FIG. 14, link domains LD1, LD4, and LD5 meet both criteria. LD2 is not chosen because it contains both the link selection and the node selection on a single port. Moreover, LD3 is not selected because it only contains the node selection.

In step 4f, the link domains are sorted. Although any standard sort function can be employed (e.g., bubble sorting, straight selection, shaker sort, quick sort, etc.), Quick Sort is preferably utilized. A comparison function must be supplied to the sort function in order for it to operate. To compare link domains, the following pseudo-code represents the rules necessary to create an appropriate comparison function: int compare_link_domains (struct link_domain_struct p, struct link_domain_struct q)
{
    if (a link port in p contains (the link selection AND a source address on any node port in q))
    return (−1) // link domain p<link domain q
    if (a link port in q contains (the node selection AND a source address on any node port in p))
    return (−1) // link domain p>link domain q
    if (a link port in q contains (the link selection AND a source address on any node port in p))
    return (1) // link domain q>link domain p [therefore p<q]
    if (a link port in p contains (the node selection AND a source address on any node port in q))
    return (1) // link domain q<link domain p [therefore p>q]
    If no return is received, then p could not be compared to q. In this rare instance, an alternative method can be used which comprises:
    (a) looking for erroneous information; or
    (b) inducing traffic between the node represented by the node selection and any node attached to a node port in p or q (to fill in the data necessary to complete a comparison; or
    (c) removing pairs p & q from the sort list and tagging them as ambiguous; or
    (d) exiting the sorting method with an error so that another node selection and link selection can be made (preferred, embodiment)

Figure 15:
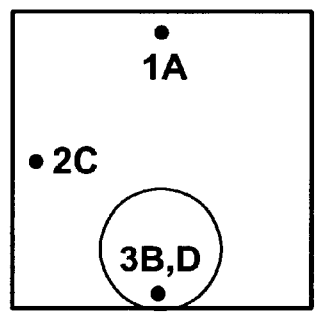
FIG. 15 shows selected link domains according to step 4e.
Figure 15:
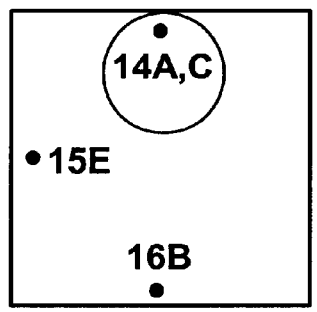
Figure 15:
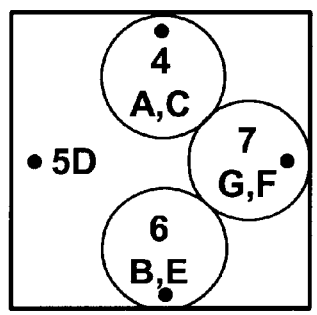

FIG. 15 shows the three link domains selected in step 4e arranged in a list. Referencing the pseudo-code for compare-link-domains above, one can see how any standard sort function could sort the three, link domains because:

(a) compare_link_domains (LD1, LD4)=−1 // meaning LD1<LD4 link port 14 on LD4 (q) contains (node selection A AND source address C [which is seen on node port 2 on LD1 (p)])
(b) compare_link_domains (LD4, LD5)=1 // meaning LD4>LD5 link port 6 on LDS (q) contains (link selection B AND source address E (which is seen on node port 15 on LD4 (p)])
(c) compare_link_domains (LD1, LD5)=−1 // meaning LD1>LD5 link port 3 on LD1 (p) contains (link selection B AND source address D [which is seen on node port 5 on LD5 (q)]

Figure 16:
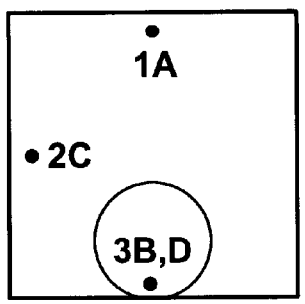
FIG. 16 shows the selected link domains shown of FIG. 15 after sorting.
Figure 16:
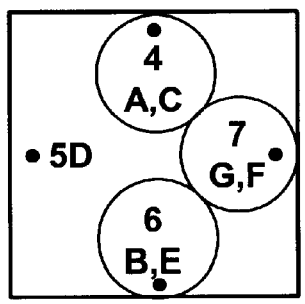
Figure 16:
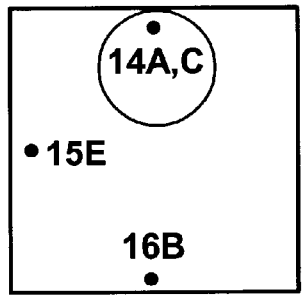

Thus, LD1<LD5<LD4. FIG. 16 contains the three link domains sorted according to ascending order.

Figure 17:
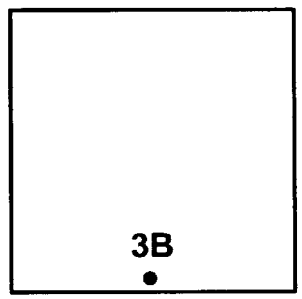
FIG. 17 shows the sorted list of link domains of FIG. 15 where only the link ports containing the node selection or link selection are depicted.
Figure 17:
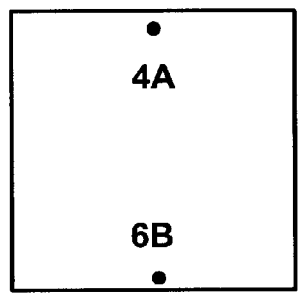
Figure 17:
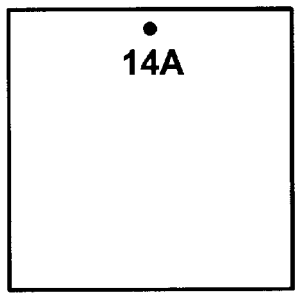

In step 4g, connections to the link ports are assigned. This is done by using the sort order determined in step 4f and the link ports in the link domains in the sorted list that either contain the node selection or a link selection. FIG. 17 shows the sorted list depicting only the link ports containing the node selection or the link selection. That is, each link port is only depicted with the node selection or link selection which is seen by it. To make the connections, to simply start at the first link domain (LD1) and connect the link port containing the link selection (port 3) to the link port in the next link domain in the source list that has the node selection (port 4). Thus LD1 port 3 connects to LD5 port 4. The process is then repeated from top to bottom for each list pair. Thus, port 6 of LD5 (containing the link selection) connects to port 14 of LD4 (containing the node selection).

Figure 18:
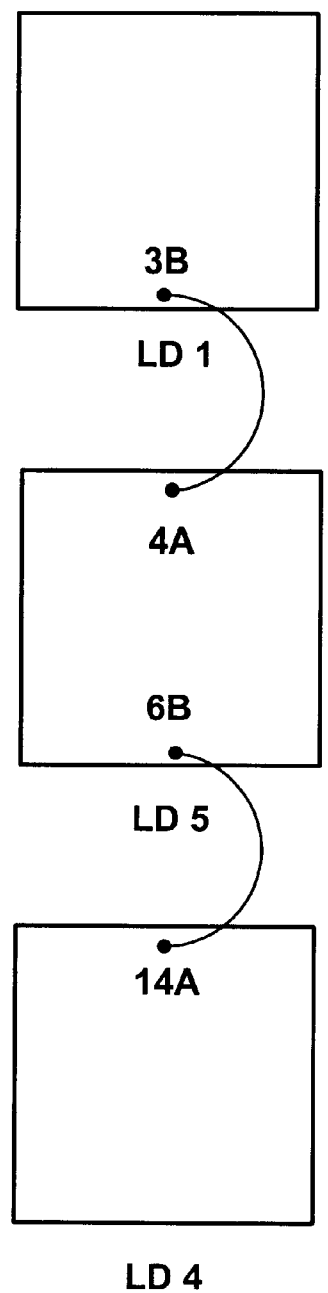
FIG. 18 shows the resolved interconnections for the selected link domains of FIG. 15.

FIG. 18 shows the connections that have been resolved in the current iteration of step 4.

In step 4h, steps 4c through 4g are repeated for every unresolved link port in the link domain chosen in step 4c In the example, LD1 was chosen. Since its sole link port has been resolved, we can now proceed to step 4i.

Figure 19:
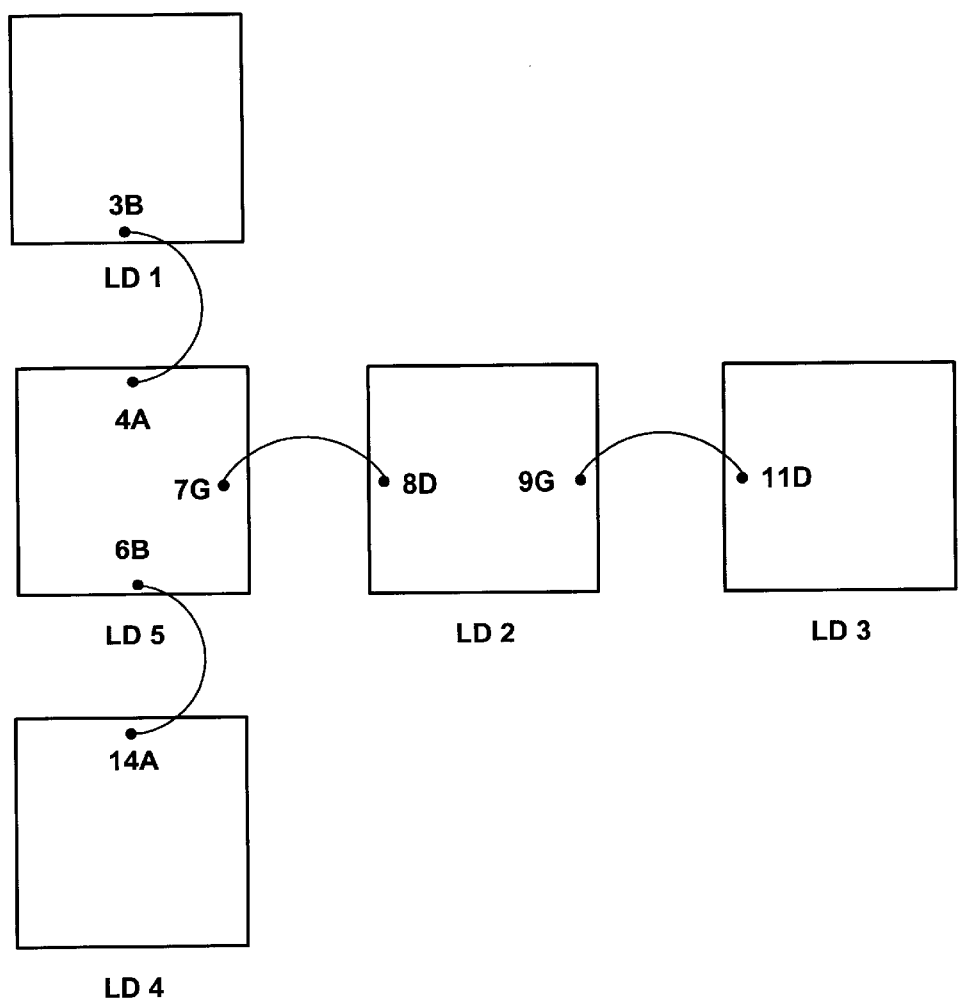
FIG. 19 shows the resolved interconnections for the link domains depicted in FIG. 14.

In step 4i, steps 4b–4h are repeated for each link domain until every link port has been assigned at least one connection. FIG. 19 shows how all the link domains for the circuit shown in FIG. 14 are connected after one or more iterations (depending on the next link domain chosen) of steps 4b–4h are completed.

In step 4j, steps 4a through 4i are repeated until the connections for every link domain has been resolved for every circuit.

In step 5, trunk and channel trunk connections are determined. Step 5 involves the same steps as step 4 except that a trunk and non-trunk source address are used.

The preferred steps for Step 5 include:

5a. Selecting a device from the complete device list that uses a trunk port and/or trunk channel;

5b. Selecting a trunk (port or channel) on the device;

5c. Selecting a source address on the trunk chosen in step 5b such that the source address chosen:
 (1) only appears on one circuit; and
 (2) does not appear on any link domains with unresolved circuits; and
 (3) only, appears on one link domain per switch;

5d. Selecting a source address on a non-trunk port from the device selected in step 5a meeting identical criteria given in steps 5c(1) through 5c(3):

5e. Identifying all devices containing the source address from 5c and the source address from 5e on different trunk ports;

5f. Sorting the devices from step 5e;

5g. Assigning connections to each trunk according to sort order;

5h. Repeating steps 5b–5g for each trunk on the chosen device; and

Figure 20:
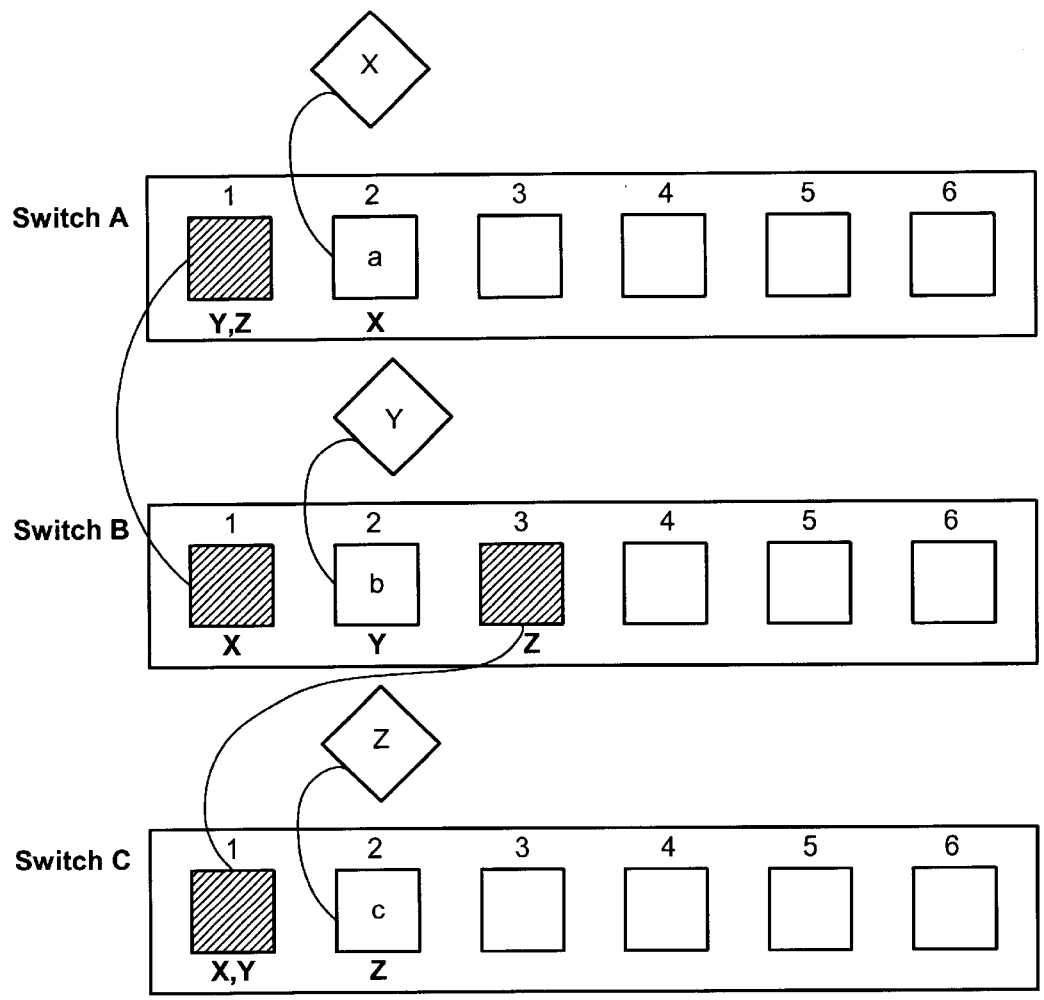
FIG. 20 is a schematic diagram depicting three devices connected via trunks.

5i. Repeating steps 5a–5h for each device;

FIG. 20 shows three devices connected via trunks. The trunk connections can be resolved via steps 5a–5i. In step 5a, one trunk device is selected. In Step 5b, any trunk is selected from the chosen trunk device. In step 5c, a source address from the chosen trunk is selected according to the three filter rules (5c(1)–5c(3)). The source address selected in step 5c may be termed the trunk selection. In step 5d, a source address from a non-trunk port on the chosen device using the same three filter rules is selected. This source selection may be termed the node selection.

In step 5e, every device that contains the node selection and the trunk selection on separate trunk ports is selected. Then in step 5f, the devices identified in step 5e are sorted using any standard sort function. Again, Quick Sort is used in the preferred embodiment. The following pseudo-code can be used to program a suitable comparison function for sorting trunk devices:

intcompare-trunk-devices (struct device-struct p, struct device-struct q)
{
 if (a trunk port in p contains (the trunk selection AND a source address on any non-trunk port in q))
 return (−1) // trunk device p<trunk device q
 if (a trunk port in q contains (the node selection AND a source address on any non-trunk port in p))
 return (−1) // trunk device p>trunk device q
 if (a trunk port in q contains (the trunk selection AND a source address on any non-trunk port in p))
 return (1) // trunk device q>trunk device p
 [therefore p<q]
 if (a trunk port in p contains (the node selection AND a source address on any non-trunk port in q))
 return (1) // trunk device q<trunk device p
[therefore p>q]

If no return is received, then p could not be compared to q. In this rare instance, an alternative method can be used which comprises:
 (a) looking for erroneous information; or
 (b) inducing traffic between the node represented by the node selection and any none trunk attached to a non-trunk port in p or q (to fill in the data necessary to complete a comparison); or
 (c) removing pairs p,&: q from the sort list and tagging them as ambiguous; or
 (d) exiting the sorting method with an error so that another node selection and trunk selection can be made.

In step 5g, the trunk connections are assigned to the sorted list starting from the top down where the trunk containing the node selection is connected to a trunk containing the trunk connection. Step 5h requires repeating steps 5a through 5g for all trunk ports on the chosen device. Finally, in step 5h steps 5a–5g are repeated for all devices that contain trunk ports or trunk channels.

In step 6, link ports that also serve as node ports are identified. The first step is to identify every source address that only appears on link ports. Next, using the link connections determined in step 4, locate each connection where each source address is seen on both sides of the connection. Each port on both sides is an entry port for the source address in consideration and is therefore both a node port; and a link port.

Figure 21:
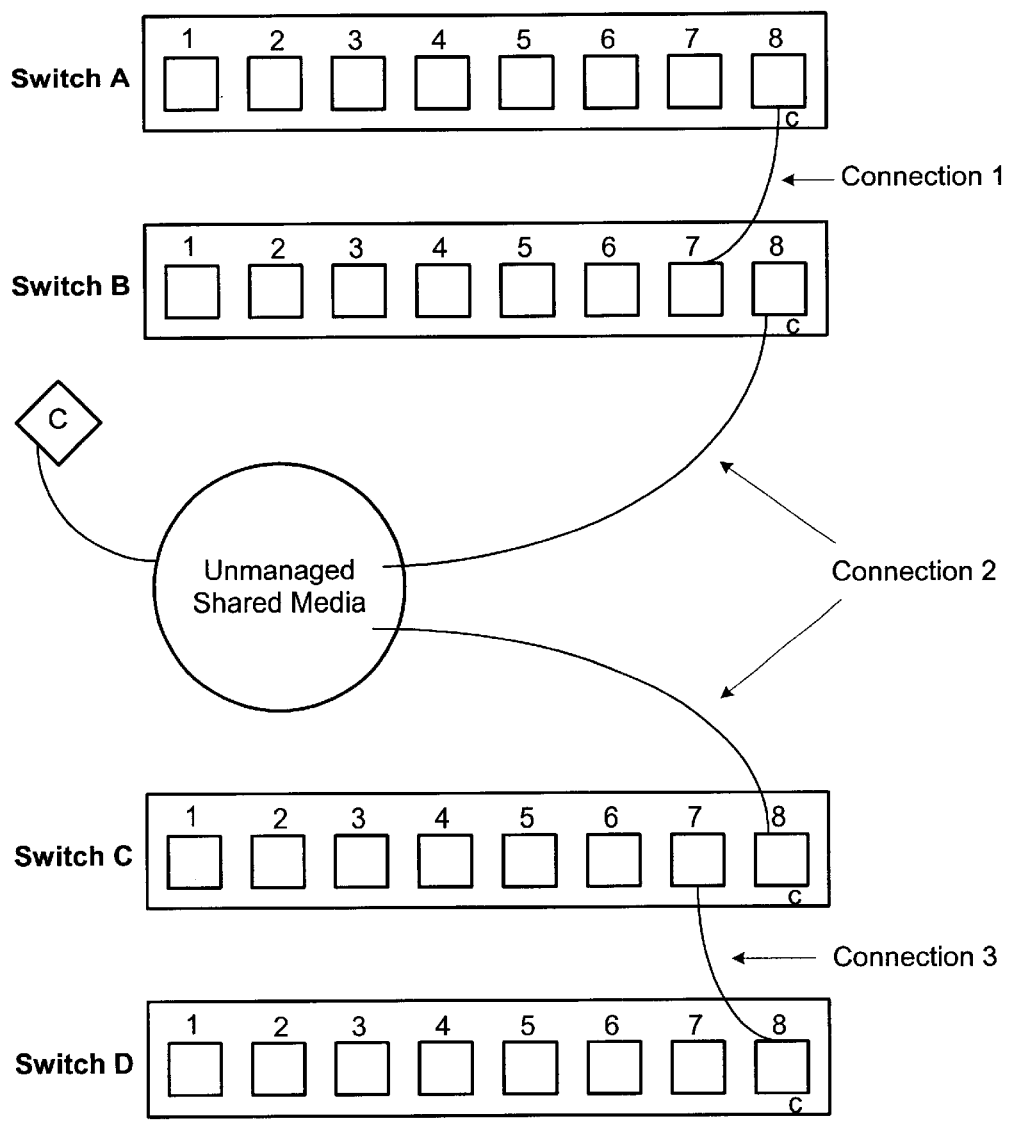
FIG. 21 is a schematic diagram illustrating how ports are assigned as node ports and link ports.

FIG. 21 illustrates how node C is only seen on link ports. However, it is only seen on both sides of one connection (connection 2). Thus, the link ports on both sides of connection 2 serve as both a link port and a node port.

In step 7, the collected information is stored, and in step 8 the collected information is utilized to display a representation of the network.

It should be understood that methods of identifying link and node ports (as per step 3) are useful in and of themselves, i.e., apart from a complete topology system. This is because one of the most common problems for network administrators is locating where specific nodes attach to the network infrastructure. The method discussed in step 3 accomplishes this goal.

Figure 22:
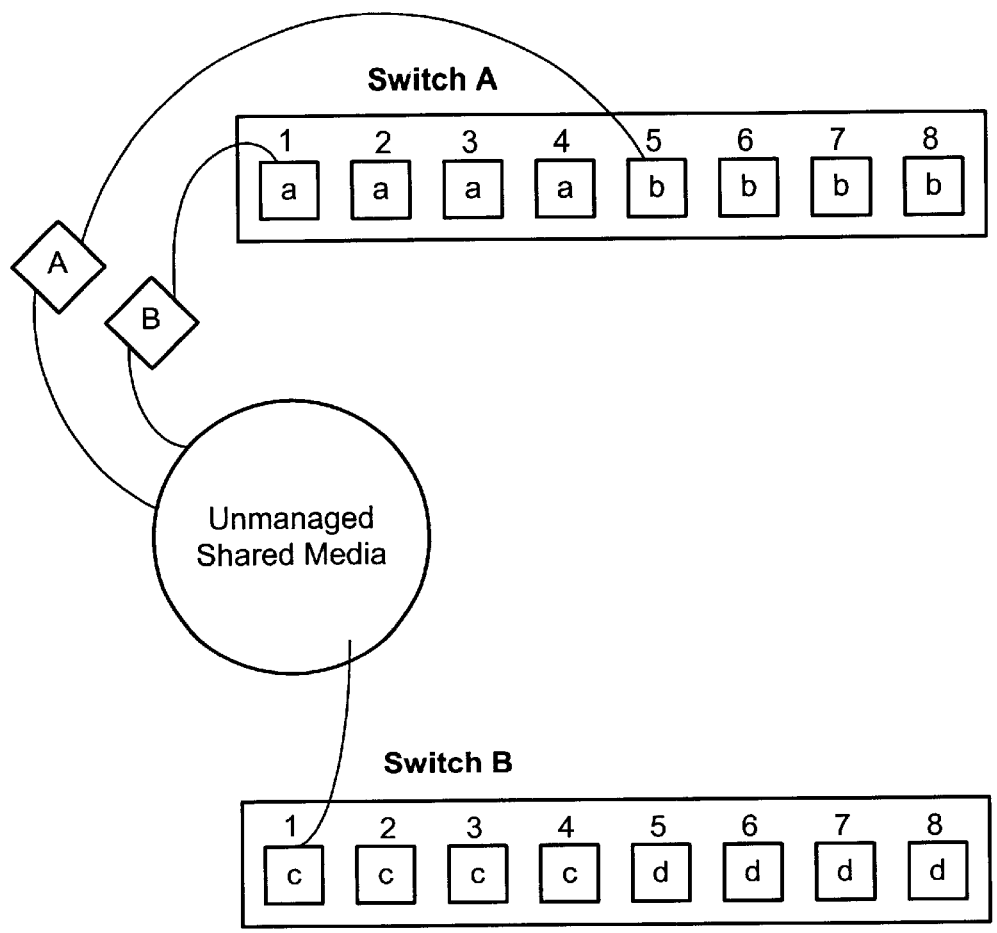
FIG. 22 is a schematic diagram depicting two devices.
Figure 23:
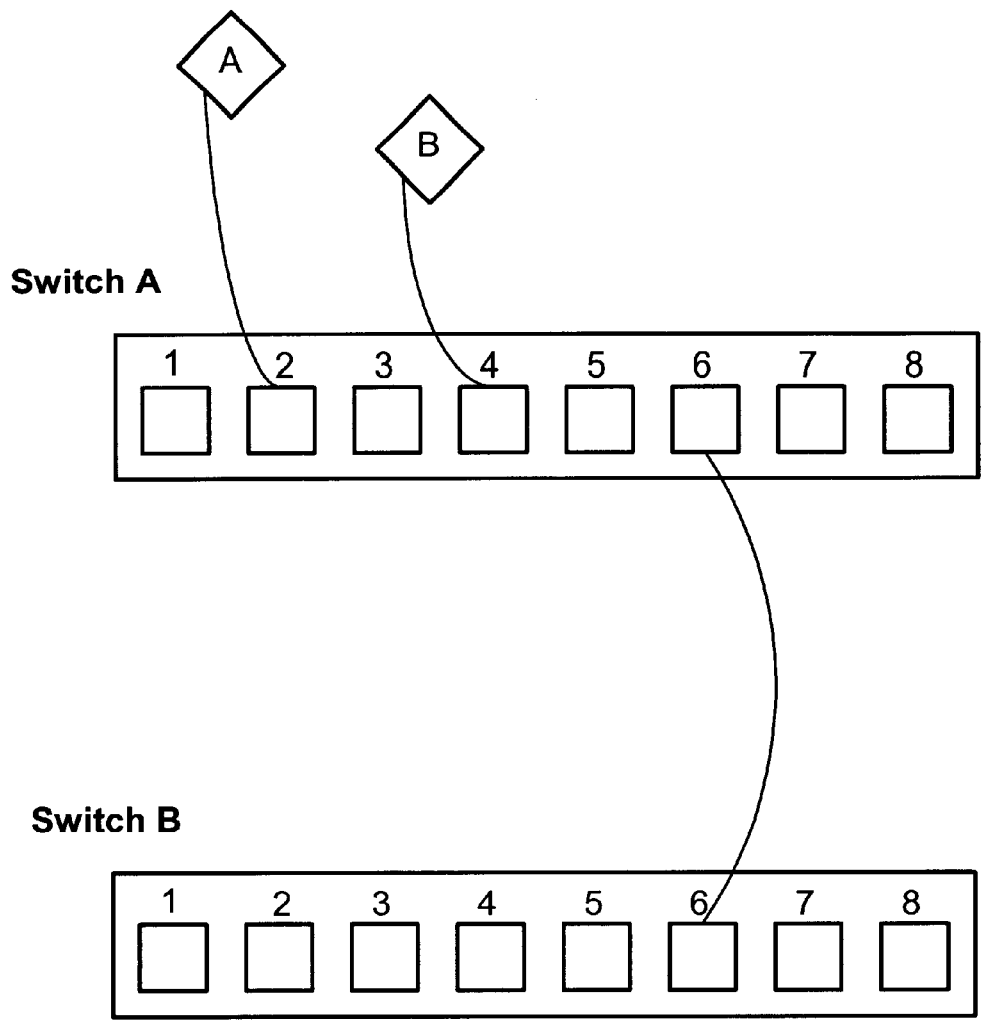
FIG. 23 s another schematic diagram depicting two devices.

The method discussed in step 3 is the preferred embodiment. However, there are many substeps contained in step 3 which may be applied in and of themselves to provide more accurate link identification than prior art methods. Each of the following steps could be utilized to provide improved accuracy and could be applied independently and/or in combination with each other. Naturally, the more steps included, the greater the accuracy:

1) Using local domains (i.e., VLAN/backplane information) to identify link ports as opposed to using every port on a physical device. Consider FIG. 22. Port 1 of switch B will record seeing both node A and node B; thus appearing to be a link port when viewed from the physical device perspective (i.e., one port on one device sees source addresses seen on two or more ports on another device.) Simply by grouping the ports according to VLAN/backplane assignments would avoid error in this example. When switch B VLAN c (local domain Bc, comprised of ports 1–4) is compared to switch A VLAN a (local domain A-a, comprised of ports 1–4) only one source address (source address B) is common to both. Likewise when local domain B-c is compared to switch A VLAN b (local domain A-b, comprised of ports 5–8) only one source address (source address A) is common to both. Therefore, VLAN c of switch B does not have any port which sees a source address seen on two or more ports from any other single VLAN/backplane, and is therefore not tagged as a link port. Local domain assignments do not solve every instance of duplicate source addresses, however they greatly decrease the odds of wrongfully assigning link ports.
2. Using global domains to identify link ports.
3. Using link domains to identify link ports.
4. Using a historical database of source addresses to identify link ports. Consider FIG. 3 If node A and node B communicate at different time periods (e.g., node A is a day time entry system and node B is used in the evening to back up other devices) port 6 of switch B may never record seeing both node A and node B simultaneously. Therefore, there may not be enough information in a single download of the source address tables to identify switch B as a link port. By maintaining a history of source address downloads, source addresses seen over multiple polling instances can be used to identify link ports. Thus, in FIG. 23, the link will be accurately identified.
5. Filtering potential source address movement using the historical database as per step 3h
6. Identifying and applying special rules to cam tables that are not aging properly as described above.
7. Grouping channel ports together as a single logical port as described above.
8. Filtering source addresses seen on multiple router interfaces as described above.
9. The methods utilized in assigning circuits as described above in connection with step 3 l.
10. The use of circuits to accurately identify links. If physical ports are separated by circuit membership, and then links are identified using prior art methods, this would eliminate many inaccuracies related to multiple source address usage in prior art systems.

The disclosed apparatus also uses a unique method for identifying link ports in addition to using the logical groupings and filters described above. This method can be applied to the physical level, local domain level, global domain level, or the link domain level.

The preferred embodiment, as discussed above in connection with step 3 is to use the link domain level. However, improvement over prior art systems can be obtained by using the method at the physical level or by using the method in connection with any of the disclosed logical grouping levels: local domain level or global domain level. The method of identifying link ports is:

1) Selecting a port on a device/logical group that has two or more source addresses;
2) If any other device/logical group has two or more ports that have at least one source address seen on the port selected in step 1, tagging the port selected as a link port;
3) Repeating steps 1 and 2 for every port in each device/logical grouping that has two or more source addresses.

Any port not assigned as a link port is tagged as a node port (unless it is a known trunk port.)

Any use of this method with or without the use of any of the logical groupings and any of the filters disclosed herein is within the spirit and scope of the present invention.

Similarly, the above mentioned substeps for steps 4 and 5 illustrate the preferred embodiment for determining link and trunk connections. However, the disclosed apparatus can also use an alternative method for determining such connections. This alternative method can be applied to the physical ports on each device or logical groupings (such as local domains, global domains, or link domains). Likewise, any of the substeps of step 3 above can be used alone or in combination with the other substeps to improve accuracy of this alternative method for determining connections. However, the preferred embodiment uses all of the logical groupings, filters, historical information, circuit definitions, and prior link identification to yield the most 20 accurate results and to a have more universal application (e.g. in dynamic environments, large network installations, where Sun UNIX hosts are used, etc.).

Both of steps 4 and step 5 can use the following alternative method of determining connections between groups (e.g., device groups or logical groups):

1. Select every group containing two common source addresses (source address X and source address) such that:
   (a) Source address Y is seen on a port within the group; and
   (b) Source address Y is seen on a different port within the same group
2. Sort the groups in either:
   (a) Ascending order—in which the group containing the node port for source address X will be first in the list after it is sorted; or
   (b) Descending order in which the group containing the node port for 5 source address X will be last in the list after it is sorted.
3. Determine connections by whether or not the list was sorted by ascending or descending order;
   (if the list was sorted in ascending order)
   (a) Connect the port containing source address y in the group above to the port containing source address X in the group below; or
   (If the list was sorted in descending order)
   (b) Connect the port containing source address X in the group above to the port containing source address Y in the group below.
4. Repeat steps 1–3 until all groups with common source addresses on different ports have been used.

The method discussed above using the ascending sort algorithm preferably uses the compare_groups,_ascending method as follows:

compare_groups_ascending (group_struct *p, group_struct *q)

Figure 24:
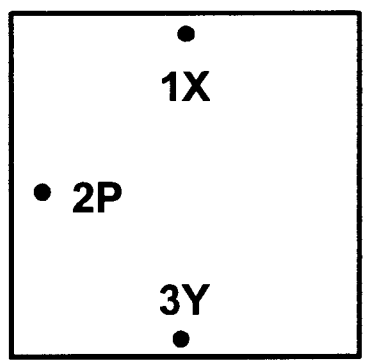
FIGS. 24 and 25 are two schematic diagrams illustrating an alternative method of determining connections according the present invention.
Figure 24:
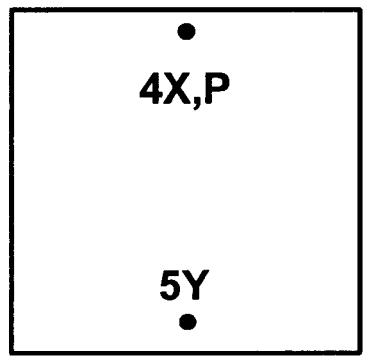

If a port in group p contains both source address Y AND another source address on any port in group q (other than the port in group q containing source address Y))

return (−1);
if a port in group q contains both (source address X AND a source address on any port in group p (other than the port in group p containing source address X))
return (−1);
if a port in group p contains both (source address X AND a source address on any port in group q (other than the port in group q containing address X))
return (1);
if a port in group q contains both (source address Y AND a source address on any port in group p (other than the port in group p containing source address Y0)
return (1);

The method discussed above using a descending sorting algorithm preferably uses 15 the following method:
compare_groups_descending (group_struct *p, group_struct *q)
if a port in group p contains both (source address Y AND another source adders on any port in group q (other than the port in group q containing source address Y))
return (1);
if a port in group q contains both (source address X AND a source address on any port in group p (other than the port in group p containing source address X−))
return (1);
if a port in group p contains both (source address X AND a source address on any port in any group q (other than the port in group q containing source address X))
return (−1);
if a port in group q contains both (source address Y AND a source address on any port in group p (other than the port in group p containing source address Y))
return (−1);

In FIG. 24, group 1 and group 2 both contain common source addresses (source address X and source address Y) on two different ports (group 1 ports 1 & 3, group 2 ports 4 & 5).

When sorting group 1 and group 2 in ascending order, group 1 is less than group 2:
compare_groups_ascending (group 1, group 2)=−1.
because a port in group 2(q) contains both:
source address X AND source address P from group 2(p)

Figure 25:
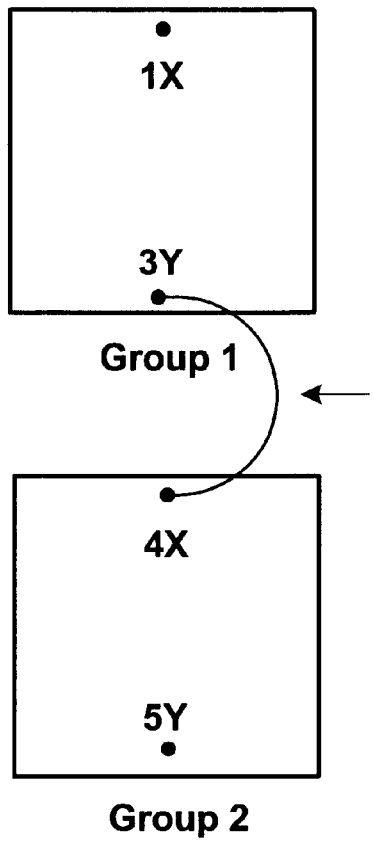

Thus, FIG. 24 already shows the two groups listed in ascending order (i.e. group 1 is above group 2). To form the connections in a list sorted by ascending order, one must connect the port containing source address Y in the group above (port 3 in Group 1) to the port containing source address X in the group below (port 4 in Group 2). FIG. 25 illustrates the connection between group 1 and group 2.

One can note that the byproduct of finding the connections is the identification of both node and link ports. This is why link ports do not have to be identified prior to using this method. The link port identification method is used in the preferred embodiment to logically group the ports, filter source addresses, assign circuits, and make use of historical data—resulting in a fast and accurate connection determination. However, this alternative method can be applied with or without any of the previous substeps to achieve more accurate results over the prior art.

One can also note that the even when the generic connection method is applied at the physical level, it is different from the brute force approaches offered by the prior art. First, step one assures that only certain groups will be compared to each other—not every group to every group as in the prior art. Second, the sort order is determined in advance as a means to identifying the connection. In the prior art cited earlier, the sort order is determined after the connections are found. The recursive method proposed by Black results in the sorted tree as the end result of the recursive connection determination. One of the last steps in the system proposed by Orr is the removal of redundant connections, revealing the sort order. Thus, when applied at the physical level, the method disclosed herein is the reverse paradigm of the methods known to date.

It is also important to note that any of the substeps of Step 3 can be applied to the prior art to improve accuracy when determining connections as well as identifying link ports. Likewise, applying any and/or all of the substeps from Step 3 improves the accuracy of the method discussed herein.

While the invention has been described in conjunction with specific embodiments and with the assistance of illustrative examples, it is evident that numerous alternatives, modifications, and variations will be apparent to those skilled in the art in light of the foregoing description.

What is claimed is:

1. A method for determining topology features of a computer network comprising:
    identifying devices on the network;
    identifying channel and trunk ports on the network;
    identifying link and node ports on the network; and
    determining connections between the devices and ports on the network.

2. The method of claim 1, wherein the step of determining connections between the devices and ports on the network includes the step of determining link and channel link connections.

3. The method of claim 1, wherein the step of determining connections between the devices and ports on the network further includes the step of determining trunk and channel trunk connections.

4. The method of claim 1, wherein the step of identifying link and node ports on the network includes the step of assigning logical port numbers to the ports.

5. The method of claim 1, wherein the step of identifying link and node ports on the network includes the steps of:
    assigning local domains;
    assigning global domains;
    assigning link domains; and
    determining which link domains can communicate with each other without the assistance of a router.

6. The method of claim 1, wherein the step of identifying link and node ports on the network includes the steps of:
    assigning local domains;
    assigning global domains; and
    determining which of the local domains and global domains can communicate with each other without the assistance of a router.

7. The method of claim 6, wherein the step of assigning global domains includes the step of determining which of the local domains are extended among two or more devices via trunk ports and/or trunk channels.

8. The method of claim 6, wherein the step of determining which of the local domains and global domains can communicate with each other without the assistance of a router includes the step of determining every router that uses unique source addresses on its interfaces.

9. The method of claim 6, wherein the step of determining which of the local domains and global domains can communicate with each other without the assistance of a router includes the step of utilizing source addresses relating to network interface cards.

10. The method of claim 6, wherein the step of determining which of the local domains and global domains can communicate with each other without the assistance of a router includes the step of utilizing router ARP tables.

11. The method of claim 6, wherein the step of determining which of the local domains and global domains can communicate with each other without the assistance of a router includes the step of filtering source address tables from ARP tables that are present on multiple router interfaces.

12. The method of claim 6, wherein the step of determining which of the local domains and global domains can communicate with each other without the assistance of a router includes the step of utilizing cam tables from switches and bridges in the network.

13. The method of claim 6, wherein the step of determining which of the local domains and global domains can communicate with each other without the assistance of a router includes the step of identifying circuits to identify every device that has only one interface.

14. The method of claim 6, wherein the step of determining which of the local domains and global domains can; communicate with each other without the assistance of a router includes the step of utilizing set theory for devices that have multiple interfaces.

15. The method of claim 6, wherein the step of assigning local domains includes the step of identifying a group of ports on a single device such that any node connected to one port in the group can communicate to any other port in the group.

16. The method of claim 6, wherein the step of determining connections comprises the steps of:

(a) selecting a circuit from a list of assigned circuits;

(b) selecting a link domain in the circuit;

(c) selecting a source address on the link domain from a link port;

(d) selecting a source address on the chosen link domain from a node port;

(e) identifying all link domains containing the source address from step (c) and the source address from (d) on different ports;

(f) sorting all link domains until all are sorted;

(g) assigning connections to each link domain according to sort order;

(h) repeating steps (c)–(g) for each link port on the link domain;

(i) repeating steps (b)–(h) for each link domain in the circuit;

(j) repeating steps (a)–(i) for each circuit.

* * * * *